US008620054B2

(12) United States Patent
Leroux et al.

(10) Patent No.: US 8,620,054 B2
(45) Date of Patent: Dec. 31, 2013

(54) IMAGE RECONSTRUCTION BASED ON ACCELERATED METHOD USING POLAR SYMMETRIES

(75) Inventors: Jean-Daniel Leroux, Sherbrooke (CA); Marc Dumoulin, Sherbrooke (CA); Roger Lecomte, Sherbrooke (CA); Réjean Fontaine, Sherbrooke (CA)

(73) Assignee: SOCPRA—Sciences Sante et Humaines, s.e.c., Sherbrooke, Quebec (CA)

( * ) Notice: Subject to any disclaimer, the term of this patent is extended or adjusted under 35 U.S.C. 154(b) by 221 days.

(21) Appl. No.: 13/228,410

(22) Filed: Sep. 8, 2011

(65) Prior Publication Data

US 2012/0063658 A1    Mar. 15, 2012

Related U.S. Application Data

(60) Provisional application No. 61/381,068, filed on Sep. 8, 2010.

(51) Int. Cl.
*G06K 9/00*    (2006.01)

(52) U.S. Cl.
USPC ......................................................... 382/131

(58) Field of Classification Search
USPC ......................................................... 382/131
See application file for complete search history.

(56) References Cited

U.S. PATENT DOCUMENTS

| | | | | |
|---|---|---|---|---|
| 5,414,623 A * | 5/1995 | Lu et al. | ......................... | 382/131 |
| 6,768,782 B1 * | 7/2004 | Hsieh et al. | ......................... | 378/8 |
| 7,173,248 B2 * | 2/2007 | Ross et al. | ................ | 250/363.03 |
| 7,332,721 B2 * | 2/2008 | Worstell | ................... | 250/363.03 |
| 7,381,959 B2 * | 6/2008 | Manjeshwar et al. | ... | 250/363.03 |
| 7,656,991 B2 * | 2/2010 | Zhou et al. | ......................... | 378/4 |
| 7,680,240 B2 * | 3/2010 | Manjeshwar et al. | ............ | 378/4 |
| 7,983,465 B2 | 7/2011 | Leroux et al. | | |
| 8,450,693 B2 * | 5/2013 | Stearns | ..................... | 250/363.03 |
| 2006/0104410 A1 * | 5/2006 | Sauer et al. | ......................... | 378/4 |
| 2010/0272335 A1 * | 10/2010 | Hu et al. | ......................... | 382/131 |
| 2013/0058548 A1 * | 3/2013 | Garg et al. | ..................... | 382/128 |
| 2013/0129176 A1 * | 5/2013 | Hu et al. | ......................... | 382/131 |

OTHER PUBLICATIONS

Leroux, J.-D.; Thibaudeau, C.; Lecomte, R.; Fontaine, R., "Fast, accurate and versatile Monte Carlo method for computing system matrix," Nuclear Science Symposium Conference Record, 2007. NSS '07. IEEE , vol. 5, No., pp. 3644,3648, Oct. 26, 2007-Nov. 3, 2007.*

* cited by examiner

*Primary Examiner* — Utpal Shah
(74) *Attorney, Agent, or Firm* — Christie, Parker & Hale, LLP

(57) ABSTRACT

An image reconstruction system and method based on image projection data collected by an imaging system having N tubes of response (TORs) having $N_\phi$ axial translation symmetries and $N_\theta$ in-plane rotation symmetries between the TORs. A system matrix mapping image projection data to pixels of an image is used, where the pixels are positioned according to a polar or cylindrical coordinate grid. During image reconstruction, matrix-vector computations are performed between the system matrix and vectors containing image estimates or image projection estimates. The matrix-vector computations are accelerated by structuring the system matrix coefficients, image vectors, and projection measurement vectors in such a way that symmetric data is stored in contiguous memory locations. Further, instead of storing the coefficients for all TOR and voxel combinations, matrix coefficients for only the subset of non-symmetric TOR and voxel combinations are stored, and the same coefficients are reused for the other symmetric TOR/voxel combinations.

19 Claims, 12 Drawing Sheets

FIG. 8

$$y_{k,j,i} \mathrel{+}= a_{k,m} \times f[d_{k,m}]_{j,i} \text{ for } i = 0,\ldots,N_\theta=8$$

IMAGE RECONSTRUCTION BASED ON ACCELERATED METHOD USING POLAR SYMMETRIES

CROSS-REFERENCE TO RELATED APPLICATIONS

This application claims priority to and the benefit of U.S. Provisional Application No. 61/381,068, filed Sep. 8, 2010, the content of which is incorporated herein by reference. This application is also related to U.S. Pat. No. 7,983,465, the content of which is incorporated herein by reference.

FIELD

The present invention relates generally to the reconstruction of tomographic images representing the distribution of some characteristic across a sectional plane (2D mode) or a volume (3D mode) of a body under investigation, from measurements obtained by an imaging system. More specifically, the present invention relates to iterative reconstruction methods and attenuation correction methods used for Positron Emission Tomography (PET), Single Photon Emission Computed Tomography (SPECT), and/or Computed Tomography (CT).

BACKGROUND

Tomography refers to the cross-sectional imaging of an object from either transmission, emission or reflection data collected from many different directions. Tomographic imaging deals with reconstructing an image from such data, commonly called projections. From a purely mathematical standpoint, a projection at a given angle is the integral of the image in the direction specified by that angle. Most of the powerful new medical imaging modalities that have been introduced during the last four decades, such as Computed Tomography (CT), Single Photon Emission Computed Tomography (SPECT), Positron Emission Tomography (PET), Magnetic Resonance Imaging (MRI) and 3D ultrasound (US), are the result of the application of tomographic principles.

It is desirable to have a system and method for reconstructing images, such as, for example, tomographic images representing the distribution of some characteristic across a sectional plane (2D mode) or a volume (3D mode) of a body under investigation, from measurements obtained by an imaging system. More particularly, it is desirable to perform an iterative reconstruction of the image in a time and space domain (hereinafter referred to as a spatial domain), where memory requirements and computations involved for the image reconstruction are reduced, while maintaining high image quality.

SUMMARY

According to one embodiment, the present invention is directed to an image reconstruction system and method configured to reconstruct an image based on image projection data acquired by the system. The system includes N tubes of response (TORs) with $N_\phi$ axial translation symmetries and $N_\theta$ in-plane rotation symmetries between the TORs. The system includes a memory (ROM, RAM, cache, and/or hard disk) and one or more processors coupled to the memory, where the one or more processors are configured to execute computer program instructions that are stored in the memory which allow the image reconstruction to occur. In this regard, the one or more processors are configured to acquire image projection data and generate a measurement data vector in response. The one or more processors are configured to order the measured image projection data according to one or more symmetries of the image reconstruction system. According to one embodiment, the measured image projection data associated with TORs having axial or translation symmetry are stored in contiguous memory locations. The one or more processors are configured to obtain a first image estimate data based on the measured image projection data. A system matrix mapping each of the measured image projection data to pixels of an image are also obtained. The pixels of the image are positioned according to a polar or cylindrical coordinate grid. Each matrix coefficient stored in the memory is associated with a TOR and pixel combination which has no axial nor translation symmetry to other TOR and pixel combinations for which a matrix coefficient has also been stored in the memory. The one or more processor are configured to iteratively compute an image estimate until a desired solution is obtained. The iteratively computing includes identifying a current image estimate stored in an image data vector; computing a measurement estimate data vector based on a first matrix-vector operation in a spatial domain between the system matrix and the current image estimate; computing a measurement correction vector based on the measurement estimate data vector and the measurement data vector; computing an image correction vector based on a second matrix-vector operation in the spatial domain between the system matrix and the measurement correction vector; and updating the current image estimate based on the image correction vector. The one or more processor output a reconstructed image based on the updated image estimate.

According to one embodiment of the invention, in performing the first matrix-vector operation or the second matrix-vector operation, a stored matrix coefficient is retrieved from the memory and reused for respectively computing values of the measurement estimate data vector or the image correction vector associated with a group of TORs having translation or rotation symmetries, before retrieving another value of the system matrix.

According to one embodiment of the invention, values of the measurement estimate data vector or image correction vector associated with a group of TORs having translation or rotation symmetries, are stored in a circular buffer memory. The size of the circular buffer memory is 2*N, wherein N is an integer value reflective of a number of the TORs having the translation or rotation symmetries.

According to one embodiment of the invention, the image data vector and measurement estimate data vector are stored in cache memory.

According to one embodiment of the invention, all or a part of the first matrix-vector operation or the second matrix-vector operation is performed with assembly language instructions configured to concurrently perform a same operation on multiple data. The operation may be an addition operation or a multiplication operation. The operation may also be performed in parallel on the multiple data in a single clock cycle. The assembly language instructions may also be executed on parallel graphics processors.

According to one embodiment of the invention, the first matrix-vector operation or second matrix-vector operation includes blocking a portion of the memory for accessing only part of the system matrix, image data vector, and measurement estimate data vector at a time.

According to one embodiment of the invention, the first matrix-vector operation or second matrix-vector operation is distributed over a plurality of processors.

According to one embodiment of the invention, the polar or cylindrical coordinate grid maintains the angular and axial symmetries between the TORs of the imaging system.

According to one embodiment of the invention, the pixels are volumetric pixels.

According to one embodiment of the invention, the computing of the measurement estimate data vector includes forward projecting the current image estimate with the system matrix to obtain an estimate of the image projection data.

According to one embodiment of the invention, the computing of the image correction vector includes back projecting the measurement correction vector with a transpose of the system matrix to obtain image correction data.

According to one embodiment of the invention, the generating of the measurement estimate data vector is performed during computing an attenuation correction factor from an attenuation coefficient map.

According to one embodiment of the invention, the system matrix is computed via an analytical method modelling a geometry of detecting elements of the imaging system.

According to one embodiment of the invention, the one or more processors are configured to order the system matrix coefficients in a TOR-row format, wherein each row of the matrix corresponds to coefficients of one TOR of the imaging system.

According to one embodiment of the invention, each matrix coefficient stored in the memory is associated with a pixel providing a non-null contribution to a particular TOR.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 8 is a pictorial view illustrating projection and image vectors having different indices when a voxel group which is not at a first angle position is processed according to one embodiment of the invention;

DETAILED DESCRIPTION

Figure 1:
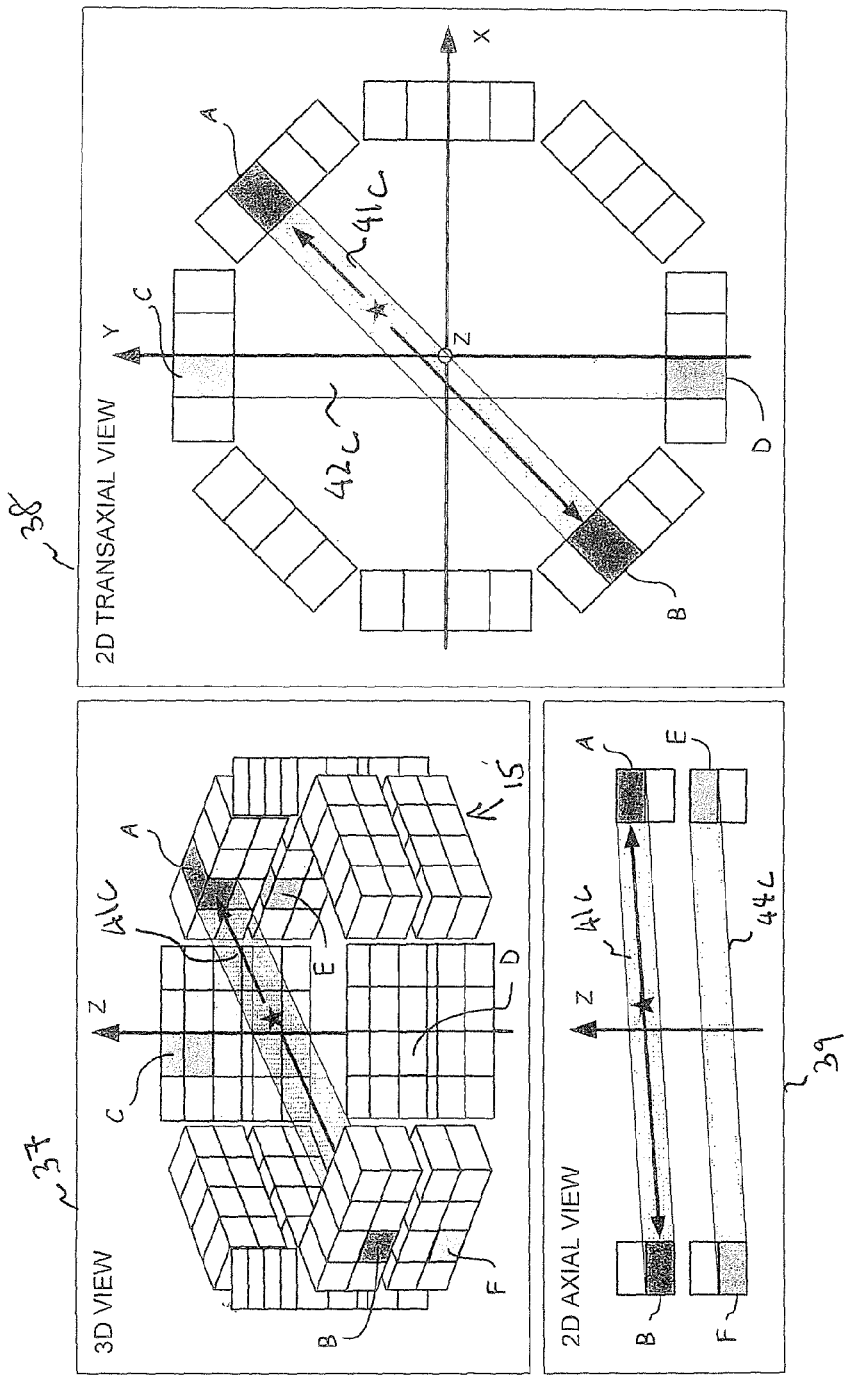
FIG. 1 is a pictorial view of all available symmetries between rubes of responses of an imaging system with perfect in-plane and axial symmetries between all detecting elements according to one embodiment of the invention.

An embodiment of the present invention addresses general tomographic reconstruction problems and, therefore, can be adapted to address all the aforementioned imaging modalities. However, for convenience and simplicity, embodiments of the present invention are directed to solving PET image reconstruction problems. A person of skill in the art should recognize, however, that the various embodiments of the present invention could be applied to solve general tomographic reconstruction problems.

Generally speaking, embodiments of the present invention are directed to an image reconstruction system and method based on image projection data collected by an imaging system having N tubes of response (TORs) having $N_\phi$ axial translation symmetries and $N_\theta$ in-plane rotation symmetries between the TORs. A system matrix mapping image projection data to pixels of an image is used, where the pixels are positioned according to a polar or cylindrical coordinate grid. During image reconstruction, matrix-vector computations are performed between the system matrix and vectors containing image estimates or image projection estimates. The matrix-vector computations are accelerated by structuring the system matrix coefficients, image vectors, and projection measurement vectors in such a way that symmetric data is stored in contiguous memory locations. Further, instead of storing the coefficients for all TOR and voxel combinations, matrix coefficients for only the subset of non-symmetric TOR and voxel combinations are stored, and the same coefficients are reused for the other symmetric TOR/voxel combinations.

Emission tomography imaging involves measuring a limited number of tracer distribution projections taken at several angles. This problem is naturally described by a continuous-to-discrete model where the continuous distribution of the tracer will be recorded by discrete detector elements. Image reconstruction methods however are generally based on a discrete-to-discrete model which involves discretization of the image according to some basis functions:

$$\overline{f}(x, y, z) = \sum_{j=1}^{B} \overline{f}_j b_j(x, y, z) \quad (1)$$

where $\overline{f}(x,y,z)$ is the discrete image approximation, $\overline{f}_j$ is the coefficient value of the $j^{th}$ basis function $b_j(x,y,z)$. The measurement vector y of N data points can be related to the B voxels of an image vector $\overline{f}$ according to:

$$\overline{y} = A\overline{f} + \overline{r} + \overline{s} \quad (2)$$

where A is a N×B system matrix with coefficients $a_{i,j}$ representing the probability that an event produced in the $j^{th}$ image voxel is detected by the $i^{th}$ detector pair, i.e., in PET, a coincident event being recorded in the $i^{th}$ element of the measurement vector, $\overline{r}$ and $\overline{s}$ are the mean of background events in PET, being respectively the random coincidences and the object scattered coincidences. Accordingly, each value of the matrix A contains two parts: the matrix coefficient which reflects the contribution of a voxel to a given TOR of the imaging system; and an index position of the voxel that contributes to the TOR.

The resolution of the image reconstruction problem in (2) can be addressed by two broad class of image reconstruction methods: "direct methods" which consist of inverting the probability matrix to obtain the image directly from a vector-matrix multiplication between the inverted matrix and the camera measurements; and "iterative methods" which consist of making some successive estimates of the density distribution of the image in respect to the probability matrix and to the measurements until the image converges to a solution that meets a given criteria. Embodiments of the present invention are directed to image reconstruction using the iterative method.

It has been shown that solving the problem in (2) with iterative methods based on an accurate and fully three-dimensional (3D) system probability matrix (i.e. A in (2)) can provide images of higher quality. However, the size of such system matrices and the computation burden associated to the computation of the matrix and the use of the matrix for iterative reconstruction often make such methods impractical. For a full 3D image reconstruction, this could lead to a matrix size exceeding the RAM memory of a computing workstation, which in turn results in important memory access overhead.

A solution to overcome the matrix size limitation includes computing the system matrix on-the-fly during the reconstruction to avoid the need of storing the matrix. This however usually implies that a fairly simple system model is used to allow fast computation of the matrix. These simplifications in the system modeling can degrade the image quality. On the other hand, a more accurate on-the-fly system matrix model could lead to longer reconstruction time.

An alternative solution which helps to reduce both the system matrix size and the reconstruction algorithm computational burden consists in decomposing the system matrix A into different components:

$$A = A_{attn} A_{det.sens} A_{det.blur} A_{geom} A_{img.blur} \quad (3)$$

where $A_{attn}$ is a N×N diagonal matrix containing factors to account for photon pair attenuation in the object, $A_{det.sens}$ is a N×N diagonal matrix containing normalization factors to account for inhomogeneities between the detector sensibility, $A_{det.blur}$ (optional) is a N×N matrix that models blurring effect in the projection data-space, $A_{geom}$ is a N×B matrix relating the data-space with the image-space and $A_{img.blur}$ (optional) is a B×B matrix that models blurring effect in the image-space. By factorizing apart some blurring effect from the original matrix A, one can reduce the overall memory requirement for storing the matrix components and also reduce the number of operations involved during the matrix-vector multiplication performed in forward and back projection steps of an iterative reconstruction algorithm.

One should note that since the diagonal matrices $A_{attn}$ and $A_{det.sens}$ result in point to point multiplication with projection data $\bar{y}$, they can be factorized apart without any assumption or simplification on the system model. In contrast, the factorization of some blurring effects in the data-space ($A_{det.blur}$) or in the image-space ($A_{img.blur}$) usually imply that some simplifications are made on the model. Although such factorizations could be made without any simplifications, they would not lead to memory saving and computational speed gains which are the main motivations for using such factorizations. In other words, the system response is often assumed to be space-invariant, allowing the image-space and/or data-space blurring effects to be modeled by a single or a limited set of functions for all tubes of responses of an image scanner.

An alternative solution to mitigate the high storage requirement of a full 3D system matrix includes using polar or cylindrical coordinates for image space representation which preserves the symmetries naturally arising between the tubes of response (TOR) of a cylindrical camera. By storing only the non-redundant part of the matrix, one can reduce the matrix storage requirements by a factor nearly equal to the number of symmetries in the camera. Such matrix size reduction enables the use of more complex system matrix model that can be precomputed and stored in a secondary storage a disk for later use by the image reconstruction algorithm. Accurate system matrix models can be obtained using analytical, empirical or Monte Carlo simulation based methods. According to an embodiment of the present invention, the analytical method is used for computing the accurate system matrix model.

An embodiment of the present invention is directed to an imaging system and method configured to model the response functions of the apparatus which minimize the size of the system matrix used by data pre-processing methods and/or by image reconstruction algorithms.

An embodiment of the present invention is also directed to accelerated methods that use a said system matrix model for computing forward and back projection steps of iterative image reconstruction algorithms.

An embodiment of the present invention is further directed to accelerated methods that use an attenuation system matrix model for computing attenuation correction factors from an attenuation coefficient map.

Generally stated, a non-restrictive embodiment of the present invention provides an imaging system and method for performing image reconstruction using a system matrix model that relates the measurements of imaging system to the pixels or volumetric pixels (voxels) of the image, wherein the pixels (or voxels) are positioned according to a polar or cylindrical coordinate grid. Pixels and voxels are used interchangeably throughout the specification. According to one embodiment, the imaging system is configured to measure Positron Emission Tomography (PET) data, or can be configured for other imaging modalities, such as, for example, Computed Tomography (CT), Single Photon Emission Computed Tomography (SPECT) and ultrasound imaging (US), as is well known in the art.

According to one embodiment, the polar or cylindrical image is discretized according to basis functions defined over a polar coordinate image grid in such a way that the symmetries present between the tubes of response (TORs) of the imaging system are preserved during the computation of the system matrix coefficients. While not restricted to, the system matrix model is precomputed using either an empirical method, an analytical method, or a Monte Carlo simulation based method that allows for an accurate system matrix model that is optimized for a given imaging system and a given image reconstruction task. The non-restrictive illustrative embodiment of the present invention also provides methods for saving, loading, structuring, and using for computation, the system matrix model derived from the polar or cylindrical grid that helps reduce the memory requirement and accelerates the computation involved during the image reconstruction procedure.

Figure 11:
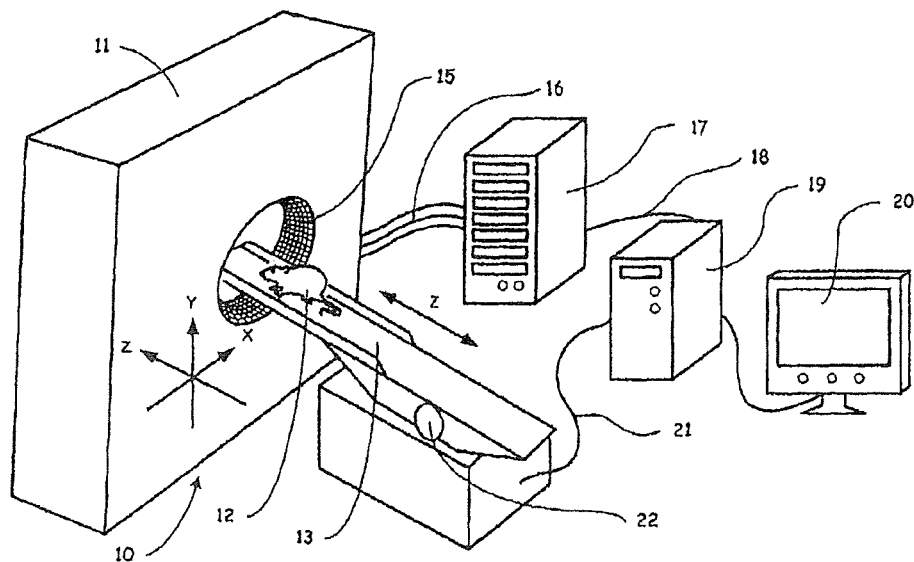
FIG. 11 is a pictorial view of an image reconstruction system according to one embodiment of the invention.

FIG. 11 is a pictorial view of a PET imaging system for reconstructing an image of a subject 12 according to one embodiment of the invention. The imaging system 10 (also referred to as the image reconstruction system) includes a gantry 11 which contains one or many detector rings 15. Each detector 15 emits a signal when it detects one of the two annihilation photons generated by a beta disintegration coming from tracers injected inside the subject 12. The gantry 11 also includes electronic and/or digital circuits which amplify and process the signal produced by the detectors 15 in order to extract valuable information for the PET measurement. PET information is transmitted from the gantry 11 to a mass storage unit 17 through high speed communication links 16. The imaging system 10 also includes an operator console 19 which is used to send instructions to a main controller 33 (FIG. 12) by some links 21 to control the PET acquisition processes and the bed 13 position. The bed 13 position can be translated along the z-axis direction inside the rings of detector 15 by sending commands to a high precision step motor 22. The operator console can also retrieve valuable PET information from the mass storage unit 17 through some links 18 and process the data to reconstruct an image of the density distribution of the tracer injected in the subject 15. The reconstructed image can then be sent to a display 20 for visualization. Additional details on the PET imaging system is provided in U.S. Pat. No. 7,983,465, the content of which is incorporated herein.

Figure 12:
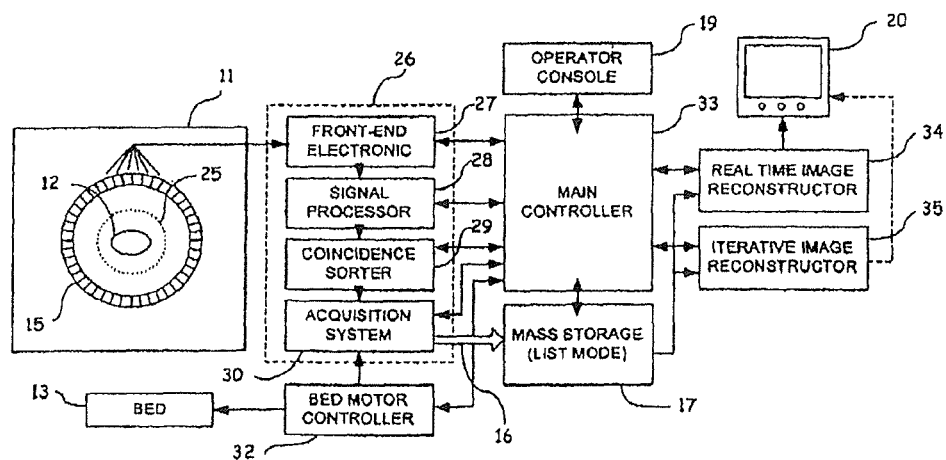
FIG. 12 is a block diagram of components of a main acquisition process according to one embodiment of the invention.

A more detailed description of the acquisition process is illustrated in a block diagrammatic view of the imaging system 10 in FIG. 12. The acquisition process is controlled from an operator console 19 which is used to send commands to the main controller 33 (e.g. a microprocessor). The main controller 33 is programmed to control the detectors 15, the front-end electronics 27, the signal processor 28, the coincidence sorter system 29, the acquisition system 30 and/or the bed motor controller 32. The front-end electronics 27 are used to amplify and shape the signal coming from all the detectors within the rings 15. As soon as a photon is detected by a detector 15, valuable PET information, such as, for example, time stamp information, detector address, and signal energy are extracted by the signal processors 28. The signal processors 28 can be composed of analog and/or digital circuits. All events detected by the signal processor 28 are sent with all their information to the coincidence sorter system 29 in order to retrieve the pair of photons that have been detected in a time nearby, thus having a high probability of coming from the same disintegration. Valid coincidence events, the ones that contribute to the count of a given tube of response (TOR) of the camera, are sent to the mass storage unit 17 through fast communication links 16 to be saved.

During the acquisition process, the operator can ask for a real time image reconstruction of the subject 12 through a command sent from the operator console 19 to the main controller 33. Coincidence measurements are then retrieved from the mass storage unit 17 and sent to the real-time image reconstructor 34 for reconstructing a two-dimensional or a three-dimensional image of the subject in a very short time. The image is sent to a display unit 20 and is continuously updated with new collected data as the acquisition progresses. The reconstructed image will represent the density distribution of the tracer injected in the subject 15 inside the region included in the camera useful field of view (FOV) 25.

During or after the acquisition process, the operator can ask for an iterative image reconstruction through a command sent from the operator console 19 to the main controller 33. The coincidence measurements are then sent to the iterative image reconstructor 35 for a two-dimensional or a three-dimensional image reconstruction. Although the iterative image reconstructor 35 may be slower than the real time image reconstructor 34, it can lead to images of better quality. In this regard, the iterative image reconstructor 35 accesses an accurate and fully developed 3D system matrix model that is precomputed (only once) by, for example, the main controller 33, and stored in the mass storage unit 17, to produce the images of better quality. According to one embodiment, although the matrix model used during iterative image reconstruction is more complex than the one used for real-time reconstruction, the use of cylindrical coordinates allows the reconstruction to be performed without excessive computation time and memory use.

According to one embodiment of the invention, the main controller 33 may be a single processor or multiple processors executing computer program instructions stored in memory (e.g. ROM) (not shown) for providing the various functionalities of the image reconstruction system. According to one embodiment of the invention, the real time and iterative image reconstructors 34, 35 are software modules stored in the memory and executed by the single or multiple processor making up the main controller 33. Preferably, multiple processors are used to allow operations of the real time and/or iterative image reconstructors 34, 35 to be divided and distributed over the multiple processors to speed up the image reconstruction process. One or more operations (e.g. addition and/or multiplication operations) of the image reconstructors 34, 35 may also be implemented via assembly language instructions. The assembly language instructions allow a same operation to be performed in parallel in a single clock cycle for reducing the computation time. In addition, memory blocking techniques may be employed so that only part of the system matrix and image measurement data vectors are accessed at a time in order to favour reuse of memory block in cache memory and RAM memory of the main controller. According to one embodiment, system matrix coefficients, image vectors, and projection measurement vectors are also ordered in such as a way that symmetric data is stored in contiguous memory locations. That is, data is restructured so that one coefficient of the system matrix is accessed only once at each iteration of the image reconstruction algorithm and reused among all symmetric TORs and voxels of the system in order to accelerate the image reconstructions process.

A person of skill in the art should recognize that real time and iterative image reconstructors may also be implemented via dedicated hardware, firmware (e.g. via an ASIC), or in any combination of software, firmware, and/or hardware.

System Symmetries

According to one embodiment of the present invention, the imaging system includes detector elements 15 positioned in such a way that symmetries arise from the TORs of the imaging system. In Positron Emission Tomography (PET), the symmetries present between the TORs of the camera generally arise from the angular and axial repetition of block of detectors that are used to compose the whole ring of detection. An example of a PET event detected within the detector rings 15 is shown in FIG. 1 in a 3D view 37, a 2D in-plane view 38, and a 2D axial view 39. In the example of FIG. 1, TOR 41c formed by detector pair A-B has a natural in-plane angular symmetry with TOR 42c formed by detector pair C-D. The TOR 41c formed by the detector pair A-B has a natural axial translation symmetry with TOR 44c formed by detector pair E-F. Accordingly, assuming that the detector symmetries are preserved during the detector ring assembly, all the in-plane and axial symmetric TORs will have the same geometric response function, that is, the same probability distribution within the volume joining the two detector elements of a given pair.

Figure 2:
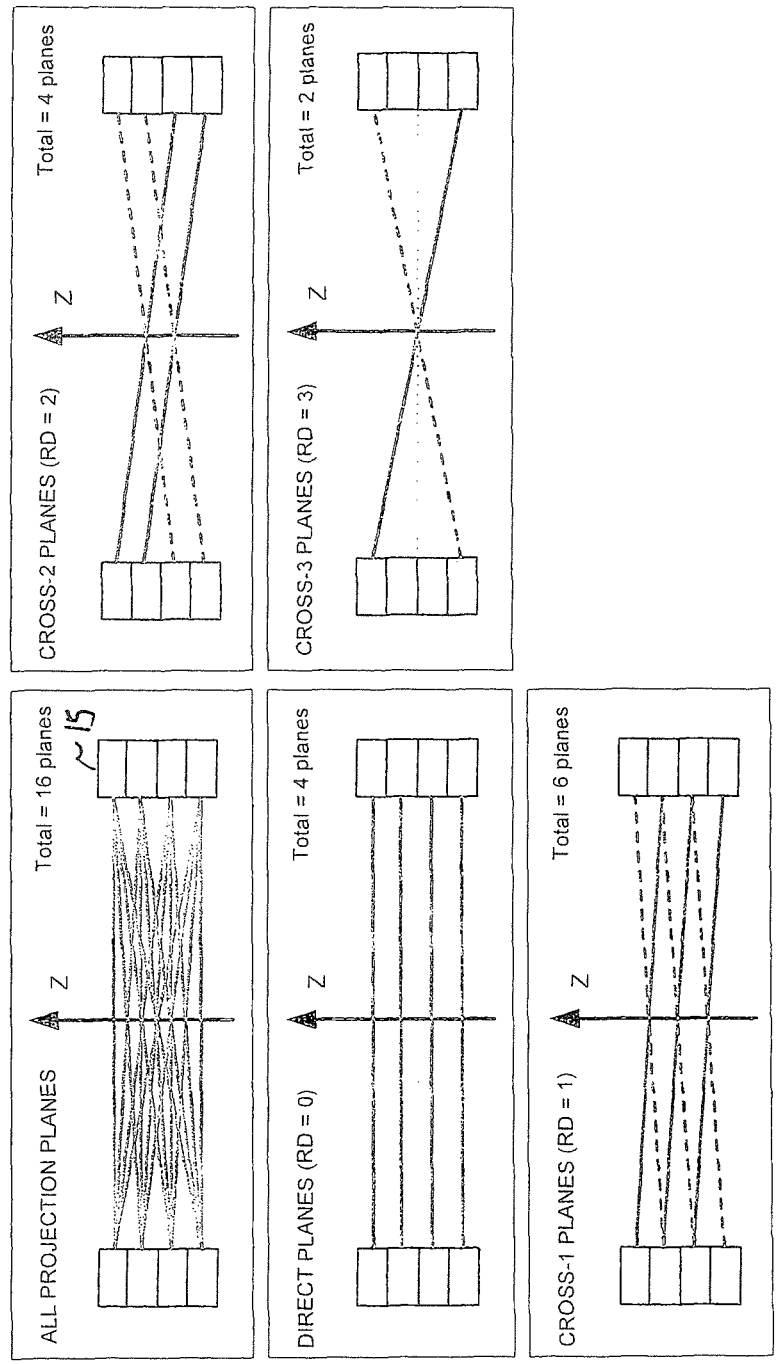
FIG. 2 is a diagram of all possible projection planes for a 4-ring scanner architecture according to one embodiment of the invention.

All the TORs of a camera will have the same number of in-plane angular symmetries. In contrast, the number of axial translation symmetries will depend on the ring difference (RD) of a given set of TORs. This is illustrated in FIG. 2 for a scanner with four rings of detectors. In this example, the direct projection planes (RD=0), which are TORs formed by detectors 15 at the same ring position, have a number of axial symmetries that is equal to the number of rings in the scanner. However, for the projection planes formed by detectors at different ring positions, referred to as cross-plane (or cross-X projection planes where X represents the ring position difference between the coincident detectors), the number of axially parallel TORs measured by the apparatus decrease as the ring difference is increased.

Cylindrical Image Representation

Figure 3:
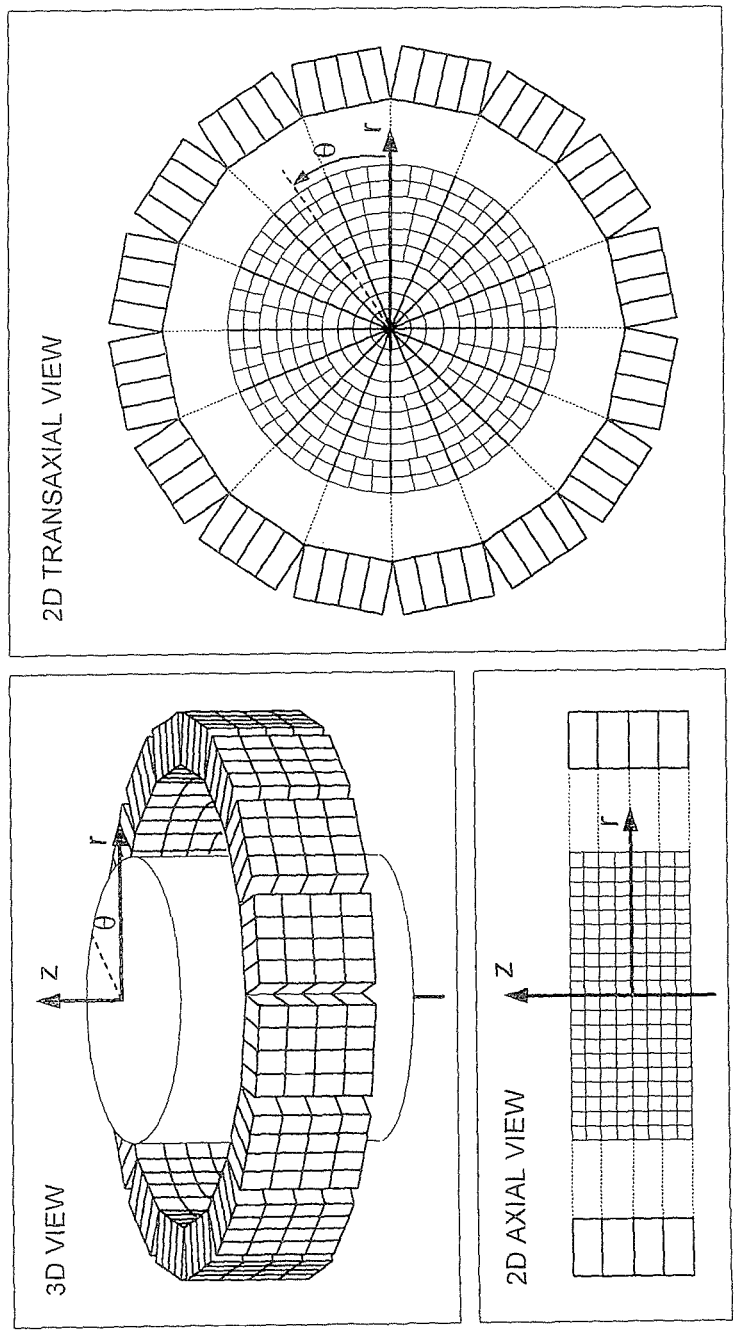
FIG. 3 is a diagram of an exemplary cylindrical image representation that is designed to preserve the angular in-plane and the translation axial symmetries of a given imaging system.

More specifically, in the non-restrictive embodiment of the present invention, an image is discretized according to a polar or cylindrical coordinate grid in such a way that the angular and axial symmetries of a given imaging system are preserved during the system matrix computation. This is achieved by using a basis function positioned according to cylindrical coordinates $(r, \theta, z)$ in replacement of the more conventional image representation based on Cartesian coordinates $(x, y, z)$. On a theoretical standpoint this leads to the replacement of (1) by:

$$\overline{f}(x, y, z) = T_{pc} \sum_{j=1}^{B} \overline{f}_j b_j(r, \theta, z) \quad (4)$$

where $T_{pc}$ denotes a cylindrical-to-Cartesian transformation. The task now consists in selecting a basis function $b_j(r, \theta, z)$ and a 3D cylindrical coordinate grid which preserves all (or most) in-plane and axial symmetries of the TORs of the camera in the system matrix model (i.e. A of equation (2) or it could be $A_{geom}$ of equation (3)). This condition is satisfied given that the number of pixels (or voxels) selected at every radius position of the polar or cylindrical image is equal, an integer fraction or an integer multiple of the number of in-plane symmetries of the said imaging system. The axial translation symmetries of the system are also preserved provided that the voxel height is an integer fraction of the distance between two symmetric ring positions. An example of a cylindrical image representation that is designed to preserve the angular in-plane and the translation axial symmetries of a given imaging system is presented in FIG. 3. The basis function $b_j(r, \theta, z)$ used in (4) can be truncated cylindrical sectors, as shown in FIG. 3, or can take different shapes (i.e. spheres, cylinders, blobs) and be overlapping as long as they preserve the symmetries in the system matrix.

System Matrix Computation

According to one embodiment of the invention, the coefficients of the system matrix are computed in a way such that the pixels (or voxels) of the image relate to the measurement recorded by each TOR of the imaging system. Depending on the imaging modality and on the image reconstruction task performed, the coefficients of the matrix can reflect different probability values that are specific to the said imaging modality and to the said image reconstruction task. According to one embodiment, it is desirable to compute a system matrix model in order to achieve high image quality.

According to one embodiment, the process of computing system matrices may be used to produce pre-computed system matrix models that are computed only once and stored in memory for later use by the imaging system for performing image reconstruction. According to another embodiment, the process may be used to produce the matrix on-the-fly during the image reconstruction procedure.

According to one embodiment, the image reconstruction system and method uses an analytical method for computing system matrix models for iterative image reconstruction tasks using data acquired with a Positron Emission Tomography (PET) imaging system. According to one embodiment, in order to reduce the overall amount of computation involved during the generation of the system matrix, the analytical method for computing the system matrix is decomposed into three main steps:

1—Computation of the Intrinsic Aperture Function (IAF)
2—Computation of the Coincidence Aperture Function (CAF)
3—Computation of the system matrix coefficients Step 1—Computation of the Intrinsic Aperture Function (IAF)

In PET imaging system, the intrinsic aperture function (IAF) of a detector is a function that gives the probability that a 511 keV annihilation photon hits a specific detector at a given incidence angle and at a given entry point and is detected and accepted as a valid event by the detector. The IAF probability can also include the probability that a given photon goes through surrounding material before hitting and being detected as a valid event by the said detector.

While not limited to, the probability of detecting a single photon by a detector within a detector assembly can be computed by using the probability of attenuation in matter:

$$I_a = (I_0 - I_t) = I_0(1 - e^{-\mu x}) \quad (5)$$

where $I_a$ is the number of photons absorbed in the matter, $I_0$ is the initial number of photons entering in the matter, $I_t$ is the number of photons transmitted without any interaction in the matter, x is the distance travelled in the matter, and $\mu(E_y)$ is the linear attenuation coefficient of the object (in cm-1) for photons with an energy of $E_y$. For PET imaging, the energy of the photon is $E_y$=511 keV which correspond to the energy of the annihilation photon that hits the detector.

Figure 4:
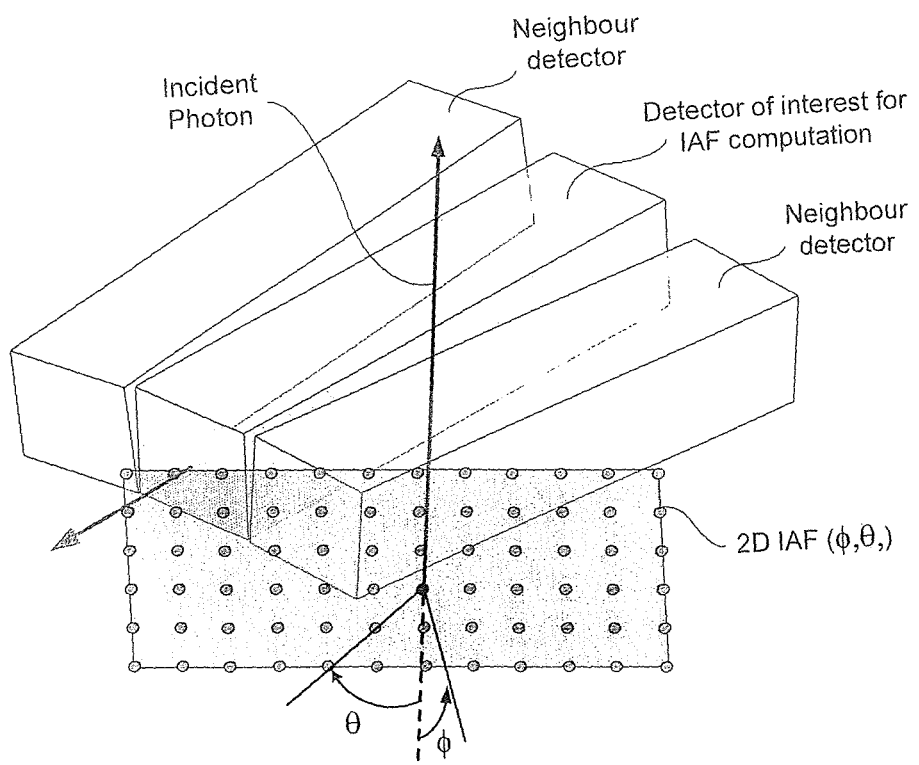
FIG. 4 is a diagram of a photon hitting a specific detector at a set of discrete entry points taken at a given tangential ($\theta$) and azimuthal angles ($\phi$)

The task of computing the IAF for a given detector 15 thus includes computing the probability of detecting the single photon for all possible impinging incidence angles and all possible entry points. According to one embodiment, however, the IAF is computed over a discrete grid that has limited number of impinging angles and entry points. The IAF for additional angles and entry points is interpolated using values computed for the discrete grid. The task for computing the IAF for a set of discrete entry points taken at a given tangential ($\theta$) and azimuthal angles ($\phi$) is illustrated in FIG. 4. According to one embodiment, the overall probability that the impinging photon will be detected by the detector of interest is obtained by computing the conjoint probability of the photon being transmitted through surrounding material (i.e. a neighbour detector) without being absorbed before being partially or fully absorbed by the detector of interest and leading to a valid event.

Once the IAF has been computed for all impinging angles and entry points, the IAF can be stored in memory for later use by the system matrix computation method. According to one embodiment, to be accurate, a different set of IAFs are computed for all non-symmetric detectors within the detector assembly. This is done since the relative position of neighbour detectors with the detector of interest may differ because the detectors are non-symmetric.

Step 2—Computation of the Coincident Aperture Function (CAF)

In PET, a valid coincident event is recorded by the system when two 511 keV photons, that are emitted apart at 180° during a positron-electron pair annihilation, are detected at the same time by two different detectors of the ring assembly.

When such a coincident detection occurs, a valid event is recorded and added to a count that is maintained for the line of response or tube of response (TOR) that relates to the two coincident detectors.

Figure 5:
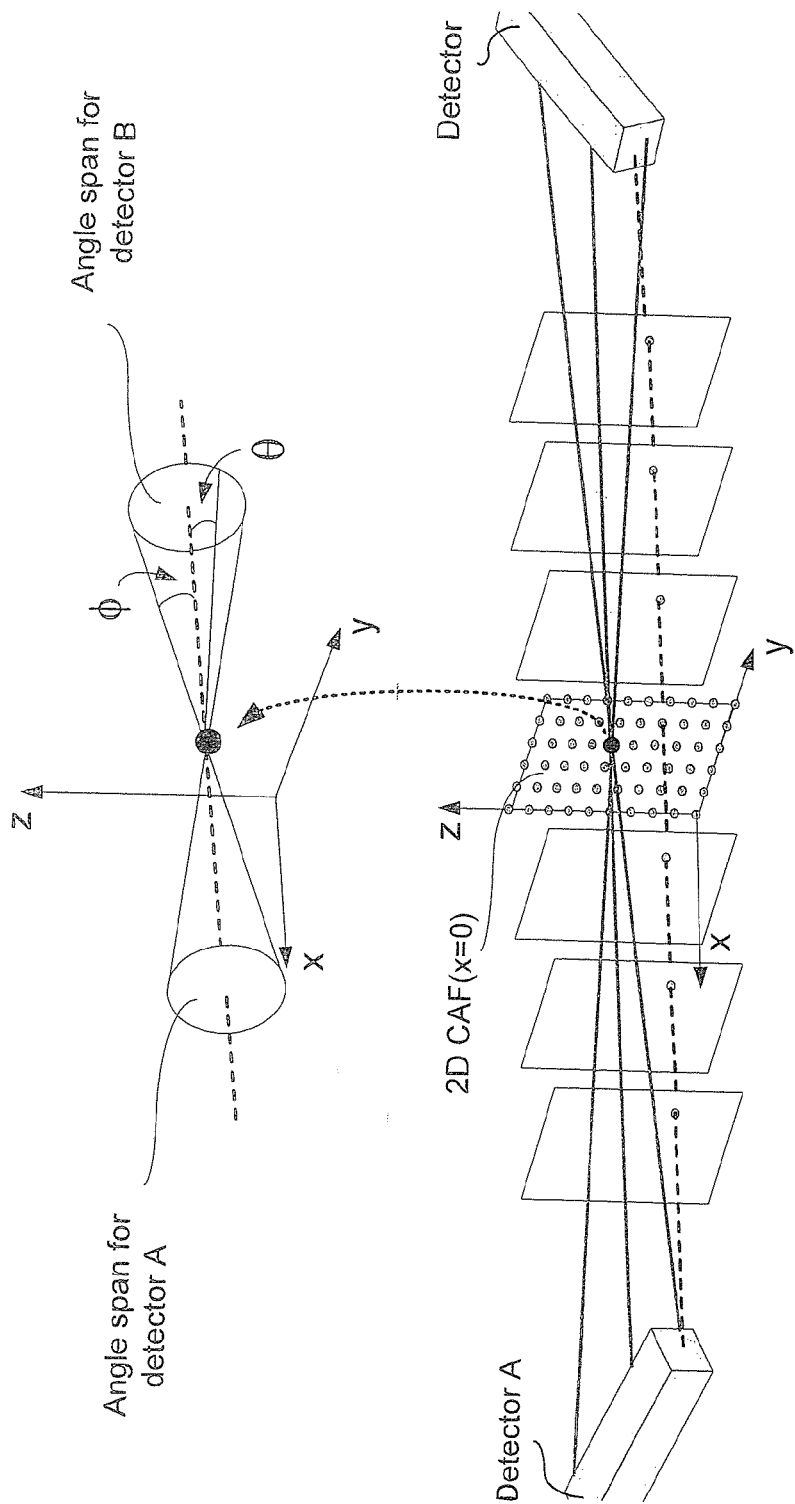
FIG. 5 is a diagram of a photon hitting two different detectors of a ring assembly at the same time according to one embodiment of the invention.

The Coincidence Aperture Function (CAF) may be referred as the probability distribution function giving the probability that a positron-electron annihilation occurring inside a TOR will be detected by the two detectors associated to the said TOR. The CAF can be computed analytically by using different techniques. According to one embodiment, the TOR volume is discretized into sample points, and the probability for each of these points that the annihilation photons emitted from that point will be detected by a pair of coincident detectors, is computed. This is illustrated in FIG. 5 for a given sample point. From a mathematical standpoint, the CAF function for a given point (x, y, z) in space and computed for a detector pair A-B can be computed as follows:

$$CAF_{AB}(x, y, z) = \sum_{\phi=0}^{\pi}\sum_{\theta=0}^{\pi}(IAF_A(\phi_A, \theta_A, x_A, y_A) \cdot IAF_B(\phi_B, \theta_B, x_B, y_B)) \quad (6)$$

where $IAF_A$ and $IAF_B$ are the intrinsic aperture functions respectively for detectors A and B, for photons that hit them respectively at an azimuthal angle $\phi$, a tangential angle $\theta$ and at an entry point (x, y) on a plane perpendicular to the photon entrance direction. While the impinging angles $\phi$ and $\theta$ are stated as being computed from 0 to $\pi$ in (6), the IAF for both detectors is non-zero only for a limited angle span for each detector (FIG. 5).

The computational burden of the CAF over the whole TOR of each detector pair depends on the precision of the grid used to sample the TOR as well as for the increment for the azimuthal ($\phi$) and tangential ($\theta$) angles used. The CAF is computed for each non-symmetric TORs of a given camera. Once these CAFs have been computed, they are saved for later use by the system matrix computation method.

Step 3—Computation of the System Matrix Coefficients

The system matrix coefficients represent the probability function that relates each voxel of the image space to an individual TOR. Since the volume of a given TOR is small compared to the volume of the image, only a small number of voxels will have non-null contribution to a given TOR. Computing the matrix coefficients includes pasting the pre-computed CAF of each TOR over the volume of each voxel of the image.

Figure 6:
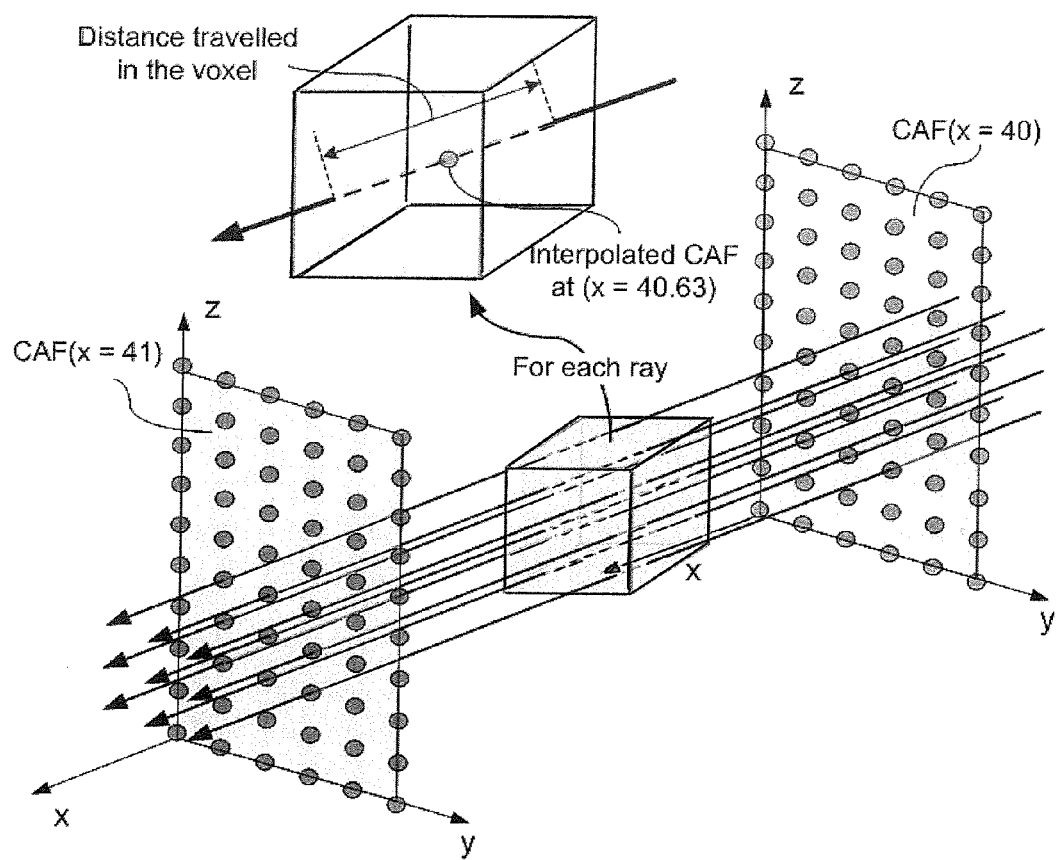
FIG. 6 is a diagram of a cubic shape voxel representation according to one embodiment of the invention.

According to one embodiment, this step is performed by computing the section length of a voxel crossed by a given TOR, and by multiplying this section by an average CAF value interpolated at a middle of the section length. According to one embodiment, to preserve the original precision of the precomputed CAF functions, the section length crossed in the voxel is computed using a set of parallel ray positions at each sample point (x, y) of the CAF. This procedure is illustrated in FIG. 6 for a voxel basis function having a cubic shape. A person of skill in the art should recognize that such a cubic shape voxel representation can be used as long as it is positioned and rotated on a cylindrical image grid in such a way that the system symmetries are preserved. Other voxel shapes like, for example, truncated cylindrical sectors, spheres, cylinders, and/or blobs can also be used as long as they preserve the symmetries in the system matrix. Given that the voxel size is relatively small compared to the selected precision used for the (x, y) grid of the CAF, the CAF is oversampled and more rays used in the computation to obtain a more accurate value for the system matrix coefficient.

From a mathematical standpoint, the computation of one system matrix coefficient $a_{i,j}$ which relates to the contribution of a voxel j to the TOR i of the camera can be computed as follow:

$$a_{i,j} = \sum_{r=0}^{R}(d_{i,j,r} \cdot CAF_{i,j,r}) \quad (7)$$

where $d_{i,j,r}$ is the distance travelled by the ray r of the TOR i within the voxel j, and $CAF_{i,j,r}$ is the probability of coincidence detection for a sample point on ray r of the TOR and interpolated in the middle of voxel j. Finally, R represents the number of parallel rays that is used in the matrix coefficient computation. The number of rays going through a given voxel in space can differ depending on the size of a voxel and on the orientation of the given TOR.

Matrix-Vector Operations with the System Matrix

In the non-restrictive embodiment of the present invention, the image reconstruction system 10 is configured to accelerate the matrix-vector computation between the cylindrical coordinate-based system matrix model and some vector data that can be, but is not limited to, a vector containing the image voxel values, some projection data collected by the given imaging system 10, or some other information used for image reconstruction.

Unlike the matrix-vector computation disclosed in U.S. Pat. No. 7,983,465, which occurs in the Fourier domain the matrix-vector computation according to embodiments of the present invention occurs in the spatial domain. Although the computation in the Fourier domain may be desirable for a system with a high number of symmetries, the computation in the spatial domain is desirable if the number of symmetries is few. Due to the fewer number of symmetries, the computation in the spatial domain may still be fast even if the matrix is not transformed to the Fourier domain. In fact, avoiding the transformation of the matrix in the Fourier domain allows the system matrix to be maintained at its minimal size.

Figure 7:
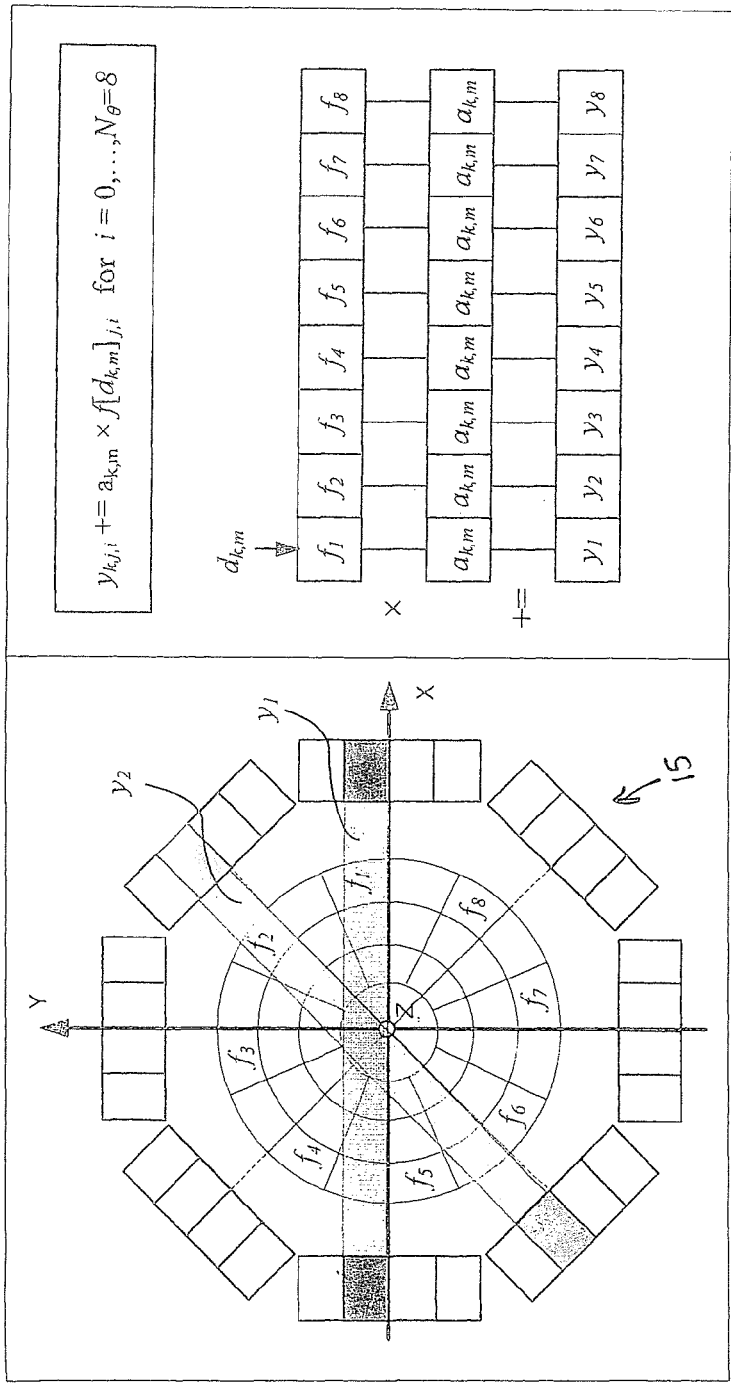
FIG. 7 is a pictorial view illustrating projection and image vectors having the same index when a beginning of a voxel group is processed according to one embodiment of the invention.

According to one embodiment, different techniques are used to accelerate the computation speed of the matrix-vector operations involved in image reconstruction algorithms in the spatial domain, such as, for example, iterative image reconstruction algorithms. These techniques include, but are not restricted to:

1—Optimal storage of the polar (or cylindrical) system matrix
2—Efficient memory access trough system matrix and data reordering
3—Using memory blocking to allow cache memory reuse
4—Using Single Access Multiple Data (SIMD) instructions
5—Considerations for parallel computation
1—Optimal Storage of the Polar (or Cylindrical) System Matrix A system matrix model derived from a polar (or cylindrical) image representation leads to some redundancies between the matrix coefficients of the symmetric TORs of the camera. In other words, a matrix coefficient that relates a given TOR to a given voxel may have the exact same value as another matrix coefficient that relates the TOR and the voxel at a next symmetric angle position. An example of such system matrix coefficient redundancies between different pairs of TORs and voxels is illustrated in FIG. 7. In this example, the matrix coefficient value ($a_{k,m}$) that relates the voxel $f_1$ with the TOR $y_1$ is exactly the same as the one that relates voxel $f_2$ with TOR $y_2$. This is also true for other angular and axial symmetric voxel/TOR pairs (e.g. $f_3$, TOR $y_3$, $f_4$, TOR $y_4$, etc.).

According to one embodiment, only the non-repeating parts of the matrix (i.e. a unique copy of the matrix coefficients) are stored. That is, instead of storing the coefficients for all TOR and voxel combinations, embodiments of the present invention store the matrix coefficients for only the subset of non-symmetric TOR and voxel combinations, and reuse the same coefficients for the other symmetric TOR/voxel combinations. That is, each matrix coefficient stored in memory is associated with a TOR/voxel combination which has no axial symmetry to other TOR/voxel combinations for which a matrix coefficient has been stored in memory. Referring to the example illustrated in FIG. 7, this will result in storing the matrix coefficient $a_{k,m}$ only once, and reusing this coefficients for computation among the symmetric TOR/voxel combinations.

Storing the non-redundant parts of the matrix reduces the memory requirement by a factor equal to the number of symmetries in the system. To achieve maximum matrix size reduction, a cylindrical coordinate image that allows preserving all the in-plane rotation and axial translation symmetries of the imaging system can be used. For some imaging systems, axial mirror symmetries can also be used to further reduce the matrix size.

To further reduce the storage requirement, only coefficients for voxels that have a non-null contribution to a given TOR are stored in memory. Such technique consists of saving the matrix coefficients in a sparse matrix format where, for each non-symmetric TOR i, the individual weight contribution of each coefficient $a_{i,j}$ is stored along with an index value $d_{i,j}$ that is used to address the voxel i to which the coefficient corresponds.

One preferred format for saving the sparse matrix consists of storing the matrix in a TOR-row ordering where each row of the matrix corresponds to coefficients of one TOR of the camera and where the matrix coefficients $a_{i,j}$ and index values $d_{i,j}$ are used to access the image voxels that have a non-null contribution to the said TOR. When using a TOR-row ordering of the matrix, the processor(s) in the main controller 33 is configured to compute and save the matrix coefficients for only the non-symmetric TORs, and reuse the same matrix coefficients for the other symmetric TORs during image reconstruction as described above and illustrated in FIG. 7.

Embodiments of the present invention can also be adapted to a voxel-row ordering format where each row of the matrix corresponds to one voxel of the image and where the matrix coefficients $a_{j,i}$ and index values $d_{j,i}$ are used to access the TORs of the camera that have a non-null contribution to the voxel. When using a voxel-row ordering of the matrix, the processor(s) in the main controller 33 is configured to compute and save the matrix coefficients for only the non-symmetric voxels and reuse the same matrix coefficients for the other symmetric voxels.

2—Efficient Memory Access Through System Matrix and Data Reordering

According to one embodiment, the system matrix coefficients and the vector data are ordered in such a way that the symmetric TORs and the symmetric voxels are stored in contiguous memory locations (e.g. RAM and/or cache memory of the main controller 33) in order to achieve high computation speed. Such a strategy is presented hereafter for system matrices stored in a TOR-row format. The method can also be adapted for matrices saved in a voxel-row format.

As an example, we will suppose an imaging system composed of N tubes of response (TORs) and having $N_\phi$ axial translation symmetries and $N_\theta$ in-plane rotation symmetries between the TORs of the camera. We will suppose further that a cylindrical coordinate image representation composed of B voxels is used for computing the system matrix model so that all the axial and the in-plane symmetries of the system are preserved in the matrix. Accordingly, the number of axial and in-plane symmetries of the cylindrical image thus correspond respectively to $B_\phi = N_\phi$ and $B_\theta = N_\theta$.

Referring to the equation (2) that expose the problem of imaging reconstruction and using the imaging system description stated above, the measurement data vector $\bar{y}$ and the image estimate vector $\bar{f}$ are reordered according to:

$$\bar{y} = \{\bar{y}_{k,j,i} : k=1, \ldots, N_y; j=1, \ldots, N_\phi; i=1, \ldots, N_\theta\} \quad (8)$$

$$\bar{f} = \{\bar{f}_{l,j,i} : k=1, \ldots, N_f; j=1 \ldots, N_\phi; i=1, \ldots, N_\theta\} \quad (9)$$

where the index i varies faster than index j which in turn varies faster than index k and index l. $N_y$ corresponds to the number of non-symmetric TORs of the camera while $N_f$ corresponds to the number of non-symmetric voxels in the image. In other words, the data in the measurement and image vectors are reordered respectively in $N_y$ and $N_f$ groups each containing $N_\phi$ sub-groups of $N_\theta$ data.

The system matrix coefficients are ordered in a TOR-row format and in a sparse matrix format so that one row $A_{(k)}$ of the matrix that contains the matrix coefficients and index values of the k group of symmetric TORs can be ordered as follows:

$$A_{(k)} = \{a_{k,m} : m=1 \ldots, M_{(k)}\} \text{ and } \{d_{k,m} : m=1 \ldots, M_{(k)}\}$$
$$\text{for } k=1, \ldots, N_y \quad (10)$$

where $M_{(k)}$ is the number of voxels that have a non-null contribution to the k group of symmetric TORs, $a_{k,m}$ and $d_{k,m}$ are respectively the matrix coefficient and the index value that map a specific TOR in the k group of symmetric TORs to a specific voxel of the m group of symmetric voxels.

The ordering of the projection data in (8), of the image voxels in (9) and of the system matrix coefficients and indexes in (10) allows the minimizing of the number of memory access and thus the memory bus traffic during the matrix-vector operations involved in image reconstruction algorithms. The technique consists in performing many mathematical operations each time a block of the system matrix coefficients is fetched from the RAM memory. Accordingly, the matrix coefficient $a_{k,m}$ and index $d_{k,m}$ values are reused among all the symmetric TORs and voxels when they are fetched from memory. That is, for a conventional iterative reconstruction algorithm, each time a matrix coefficient is used, there is an index that points to a location in the image. According to one embodiment of the present invention, each time the matrix coefficient is accessed, there is also an index that points somewhere in the image. However, according to embodiments of the present invention, the index points to a block of data that have axial and angular symmetries, that is stored in contiguous memory locations, so the cost of fetching the memory is less. That is, the contribution from voxels that have rotation and axial symmetries are stored in contiguous memory locations in order to optimize cache memory reuse.

The technique explained in the above paragraph is illustrated in FIG. 7 for the simple case of using only in-plane rotation symmetries. It can be easily extend to the case of using also the axial system symmetries. In this example, the symmetric TORs ($y_i$ for i=1 to 8) and the symmetric voxels ($f_i$ for i=1 to 8) are each stored on contiguous memory location. When the matrix coefficient $a_{k,m}$ is fetched from memory, it is reused for the computation of each symmetric TOR/voxel pairs.

According to one embodiment, the measurement data that is initially acquired by the imaging system is reordered after its acquisition so that measurement data for symmetric TORs are stored in contiguous memory locations. Furthermore, the image estimate vector is ordered so that the symmetric voxels are stored in contiguous memory locations. This ordering of the image vector is preserved throughout the whole image reconstruction procedure and at the end of this procedure it may be reordered and converted into a Cartesian image representation that is suitable for display on conventional computer screen. The obtained measurement data as produced by the imaging system can be initially stored in a list-mode format or can be stored directly in a histogram format. In the list-mode format, every event that is collected by the imaging system is initially stored in memory according to the order of collection. The list-mode format has the advantage of preserving the detection time history of the collected data. The histogram data organizes the events collected by the imaging system in an aggregated manner so that all events that were detected by a given TOR are summed together and stored in one memory location. According to one embodiment, the measurement data produced in the list-mode by the imaging system is first converted into a histogram format by the processor(s) in the main controller 33, and reordered according to equation (8). Although the imaging system may provide the measurement data directly in a histogram format, the histogram data still needs to be reordered according to equation (8).

According to one embodiment of the invention, in contrast to the measurement data vector that is ordered correctly each time new measurement data is collected by the imaging system for image reconstruction, the system matrix sparse storage strategy as proposed in equation (10) is performed only once after the system matrix coefficients have been generated by a matrix computation algorithm. The system matrix is then stored in memory in that specific format and ordering. As discussed previously, only non-null coefficients of the matrix are stored in memory. Moreover, in regards to the system matrix coefficient ordering, as a person of skill in the art will appreciate, once the measurement vector and system matrix coefficients have been reordered, the data in the image estimate vector which is created based on the system matrix coefficients and the measurement vector automatically assumes the desired order. In other words, by ordering the measurement vector and the image vector so that respectively the symmetric TORs and voxels are stored in contiguous memory locations, the system matrix that relates the measurement vector to the image vector is known to be in a specific order as stated in equation (10). As discussed above, the ordering of the matrix can be different depending on whether the TOR-driven or voxel-driven approach is used for the vector to matrix computation during image reconstruction. One embodiment of the invention utilizes the TOR-driven approach, and such TOR-driven approach is described herein.

When the matrix-vector task consists of a multiplication between the system matrix A and the image vector $\bar{f}$ to obtain the projection data $\bar{y}$, the following pseudo-code is obtained for computation using the TOR-driven approach:

---
Pseudo-code C-1 (forward projection):

for k = 1 to $N_y$
  for m = 1 to $M_{(k)}$
    for j = 1 to $N_\phi$
      for i = 1 to $N_\theta$

---

-continued

Pseudo-code C-1 (forward projection):

$y_{k,j,i}$ += $a_{k,m}$ · f[$d_{k,m}$]$_{j,i}$
      end for i
    end for j
  end for m
end for k

---

When the matrix-vector task consists in a multiplication between the transpose of the system matrix ($A^T$) and the projection data $\bar{y}$ to obtain and image vector $\bar{f}$, the following pseudo-code is obtained for computation using the TOR-driven approach:

---
Pseudo-code C-1 (back projection):

for k = 1 to $N_y$
  for m = 1 to $M_{(k)}$
    for j = 1 to $N_\phi$
      for i = 1 to $N_\theta$
        f[$d_{k,m}$]$_{j,i}$ += $a_{k,m}$ · $y_{k,j,i}$
      end for i
    end for j
  end for m
end for k

---

When the above pseudo-code loops through the various indices, this helps ensure contiguous memory location storage for the angular and axial symmetries. That is, the algorithm loops through all the angular indices i before looping through all axial positions j, thereby allowing the continuous memory location storage for the angular and axial symmetries during the process of image reconstruction.

Some precision should be added concerning the step of indexing the image vector with the $d_{k,m}$ index value in pseudo-code C-1. In fact, the $d_{k,m}$ index contains the absolute index position of a specific voxel having a non-null contribution to a specific TOR of the camera. Accordingly, the $d_{k,m}$ index serves both at selecting the right voxel group (i.e. l=1, ..., $N_f$) and at selecting the right axial position (i.e. j=1, ..., $N_\phi$) and angular position (i.e. i=1, ..., $N_\theta$). The right voxel position should therefore be fetched before cycling through the axial and angular symmetries of a group. This helps explain why the j and i indices are placed after the indexing of the image in pseudo-code C-1 (i.e. $f[d_{k,m}]_{j,i}$).

With regards to implementation, the indexing of the different axial symmetry positions of the cylindrical image is quite straightforward as will be appreciated by a person of skill in the art. However, the circulant nature of the angular symmetries require some special care when performing the inner loop of pseudo-code C-1. For example, as shown in FIG. 7, when the dk,m index points at the beginning of a voxel group, that is at =1, the inner loop of pseudo-code C-1 results in the projection data vector y and image vector f having the same angular index i. However, when the dk,m index refers to a voxel which is not at the first angle position (θ!=1), the inner loop of pseudo-code C-1 is then divided into two steps as is illustrated in FIG. 8. This second scenario which occurs more often requires extra operations and leads to some memory access on non-contiguous memory locations.

Figure 9:
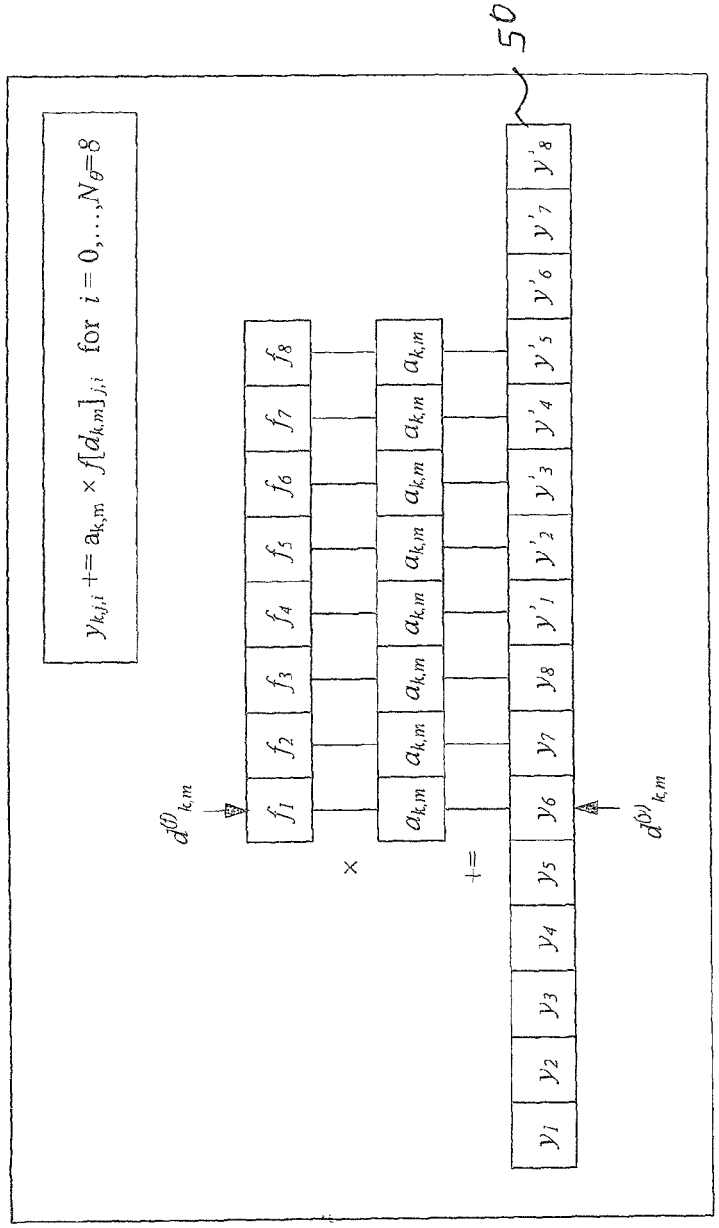
FIG. 9 is a schematic view of a circular buffer for storing a projection data vector according to one embodiment of the invention.

According to one possible implementation of the present invention, a circular buffer is provided to make the pseudo-code C-1 inner loop multiplication more efficient. This technique is illustrated in FIG. 9. It consists of using a memory buffer 50 for the projection data vector y which is twice the size of the number of angular symmetries. We also make use of two different indices, $d(f)_{k,m}$ and $d(y)_{k,m}$, which respectively point to the right image address and projection data offset address. Such a technique helps ensure that the data is always addressed on contiguous memory locations. After having run through all the different matrix coefficients and indices for a given TOR group k (i.e. at the end of the loop: for m=1 to $M_{(k)}$), the values of the two parts of the circular buffer are then added together to get the final result.

In the embodiment where a voxel-row ordering format is utilized where each row of the matrix corresponds to one voxel of the image and where the matrix coefficients $a_{j,i}$ and index values $d_{j,i}$ are used to access the TORs of the camera that have a non-null contribution to the voxel, the circular buffer is used to store the image vector instead of the projection data vector.

The following is an example that illustrates the benefit of using a circular buffer according to one embodiment of the invention. Assume a matrix coefficient a(0, 6) which relates the measurement y(0) to voxel x(6), where 0 and 6 are at angles 0 and 6, respectively. In other words a(0, 6) is the matrix coefficient that expresses what the contribution of voxel x(6) (i.e. the one at angle=6) will be to the measurement y(0) (i.e. the one at angle=0).

In an imaging system with perfect rotation symmetries between the measurements, the coefficient a(0, 6) can be reused among the symmetric measurements and voxels as follows:

$$y(0)=a(0,6)*x(6);$$

$$y(1)=a(0,6)*x(7);$$

$$y(2)=a(0,6)*x(8);$$

. . .

$$y(N-1)=a(0,6)*x(6+N-1)$$

where x(6+N−1) will in fact be x(5) since we will have made a wrap around of the voxel angle. According to one embodiment, using the circular buffer with a memory size of (2*N) avoids identifying the location where the voxel wrap around will take place during the computation. That is, by using the circular buffer, the system may use the x(6+N−1) address instead of having to make a verification for address indexing overflow and having to use x(5). In this manner, the algorithm simply sums up the two parts of the circular buffer at the end of a computation section as follows:

$$[x(0) \ldots x(N-1)]=[x(0) \ldots x(N-1)]+[x(N) \ldots x(N-1)]$$

3—Using Memory Blocking to Allow Cache Memory Reuse

As shown in the previous section, a proper ordering of both the system matrix coefficients and of the projection and image data vectors allow efficient memory access on contiguous memory locations. To reduce even more the memory bus traffic on the different memory levels of recent computer architecture, embodiments of the present invention take care of data locality and reuse during the computation. The memory levels available on standard computer architecture usually are, from slower to faster memory access, the hard disk, the RAM memory and the L3, L2 and L1 cache memory. In order to fully take advantage of the fast memory bus access of the L1 cache, an attempt is generally made to fully store in the L1 cache the data that is accessed frequently during the computation. Given that the size of the L1 cache memory is not enough, an attempt is made to try to fit the data in the L2 cache, L3 cache or at least in the RAM memory of a given computer architecture.

Given the above considerations, the pseudo-code C-1 used for matrix-vector operations can be modified to improve memory locality and reuse which will in turn lead to reduction of the bus traffic on the different memory levels of a given computer architecture, such as a computer architecture incorporated in the image reconstruction system 10. According to one embodiment, this can be achieved by decomposing the matrix-vector computation into sub-tasks that address only limited block memory regions of the image and projection data vectors. The size of the block region for the image and for the projection data should ideally be selected to either fit in the L1 or L2 cache memory of a given processor. Using memory blocking techniques with a block dimension of Sy and Sf respectively for the projection and image vectors, the pseudo-code C-1 now becomes:

Pseudo-code C-2 (forward projection):

```
for kk = 1 to S_y
    for k = 1 to (N_y/S_y)
        for mm = 1 to S_f
            for m = 1 to (M_(k) < N_f/S_f)
                for j = 1 to N_φ
                    for i = 1 to N_θ
                        y_{k,j,i} += a_{k,m} · f[d_{k,m}]_{j,i}
                    end for i
                end for j
            end for m
        end for mm
    end for k
end for kk
```

Pseudo-code C-2 (back projection):

```
for kk = 1 to S_y
    for k = 1 to (N_y/S_y)
        for mm = 1 to S_f
            for m = 1 to (M_(k) < N_f/S_f)
                for j = 1 to N_φ
                    for i = 1 to N_θ
                        f[d_{k,m}]_{j,i} += a_{k,m} · y_{k,j,i}
                    end for i
                end for j
            end for m
        end for mm
    end for k
end for kk
```

4—Using Single Access Multiple Data (SIMD) Instructions

The Single Access Multiple Data (SIMD) technology is directed to assembly language instructions that allow performance of a same operation on multiple data simultaneously. The SIMD technology is available on many processor available on the market which include the most recent ones produced by Intel and AMD.

According to one preferred embodiment of the present invention, the most intensive computation loops are optimized using SIMD assembly instructions as provided by the Intel and AMD processors. In this manner, the SIMD instructions are used to accelerate the addition and multiplication operations performed in the innermost loop of the pseudo-code C-1. For 32-bit floating point operations, the SIMD instructions allow performance of the same operation on four floating point data in parallel in a single clock cycle. Since a group of $N_φ \cdot N_θ$ data in the projection or image vector is already stored on contiguous memory locations, the insertion of a SIMD instruction in the pseudo-code C-1 is quite straightforward as will be appreciated by a person of skill in the art. However, since the same matrix coefficient $a_{k,m}$ is used to perform all point-to-point multiplications between the matrix and the Nφ·Nθ symmetric data of an image or projection data group, the matrix coefficient is duplicated to four memory locations in SIMD registers before being used in the computation.

Figure 10:
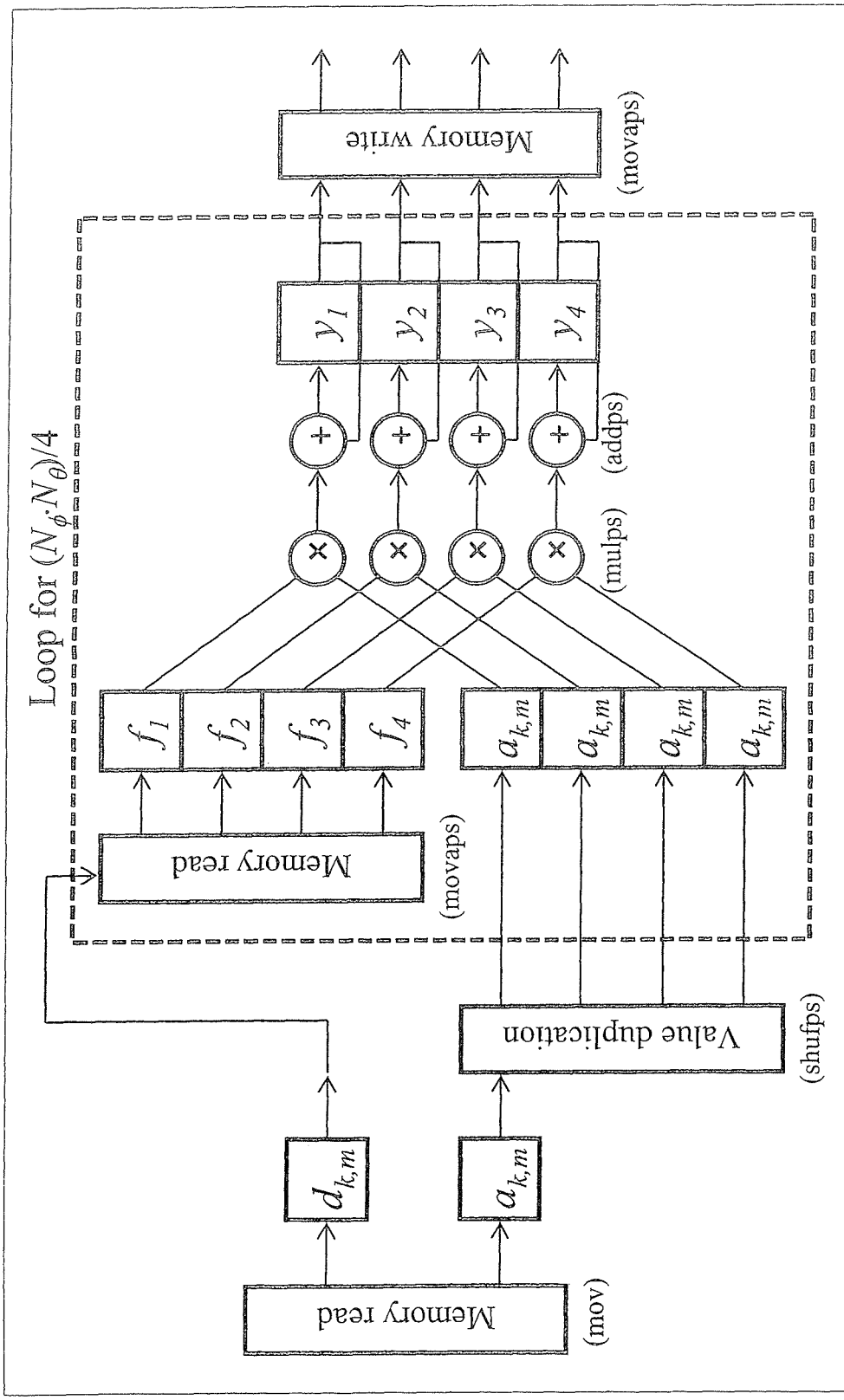
FIG. 10 illustrates use of assembly language instructions according to a single access multiple data technology according to one embodiment of the invention.

An overview of the pseudo-code C-1 and C-2 inner loop based on SIMD instructions is shown in FIG. 10. As illustrated on this figure, the system matrix coefficient (ak,m) and index (dk,m) are accessed only once for each block of Nφ·Nθ data. The different SIMD instructions (e.g. shufps, movaps, mulps, addps) involve four floating point data and can usually be performed in one clock cycle. In order to simplify the schematic of FIG. 10, the memory read and write operations on the projection data vector (y) is not illustrated. In fact, the memory read and write for the projection data vector (y) may not be required given that there are sufficient SIMD registers to store the (Nφ·Nθ)/4 groups of packed data.

It is to be understood that the principle of multiple parallel operations of the same instruction in the same clock cycles like the example of SIMD technology can be applied to other processors and technologies. For example, some graphic card technologies allow the same operation to be executed on many embedded parallel graphics processors on the same clock cycles. Accordingly, a person of skill in the art will appreciate adaptations of the strategy presented in this section for making efficient use of SIMD technology, to apply those adaptation to other technologies, such as for example, the graphic card technology, to promote additional parallel instructions.

5—Considerations for Parallel Computation

Recent advances in computer design have lead to the integration of more than one processor on a given computer system, leading to computation architecture being able to execute many tasks in parallel. Accordingly, the various processing components of the image system 10 of FIG. 12 could be modified to include more than one processor for each processing component. To take full advantage of all the available resources of such a system, an algorithm is provided to distribute its computation task over more than one processor.

This embodiment of the invention has high potential for parallel computation. According to pseudo-code C-1 and C-2, the task of computing the value of the projection data $\bar{y}$ vector can be divided into many sub-tasks that can be sent to different processors where each processor would be responsible of computing a subset of the projection data. According to one embodiment, the task is split by subdividing the outer loop of pseudo-code C-1 and C-2 into different tasks that are executed in parallel instead of being executed sequentially. According to one embodiment, in order to obtain the best performance, the computation load is balanced between the different processors. According to one embodiment, the task is divided so that each processor performs the same amount of operations. However, when performing matrix-vector operations with sparse matrices, which is the case for image reconstruction, the time of computation may not depend solely on the number of mathematical operations. In order to address such a situation, embodiments of the present invention perform a speed benchmark with a given system matrix in order to determine the ideal configuration for task-sharing between the processors of a given computation architecture.

Optimization techniques presented in the previous sections, like using contiguous memory access and performing memory blocking techniques, also help achieve high performance for parallel computation. In fact, parallel computation are most of the time limited by the speed of memory access at higher level. While most processors have their own L1 cache memory, some processors share the L2 cache and/or the RAM memory bus. The different techniques presented earlier for reducing memory bus traffic and maximizing memory reuse thus help achieve high parallel computation speed.

The consideration for parallel computation can differ depending on the computation architecture used for performing the image reconstruction according to embodiments of the present invention. However, for most computation technology, optimizing memory access and reuse is generally one of the main aspects for high parallel computation capability. In the non-restrictive embodiment of the present invention, the computation architecture used by the image reconstruction system 10 can be multi-processor computer technology, graphic card technology, dedicated hardware based on ASIC design and/or on FPGA circuits.

Image Reconstruction

According to one embodiment, the image system 10 also incorporates a general framework for accelerating the matrix-vector operations involved in iterative image reconstruction. Although embodiments of the present invention incorporates a Maximum Likelihood Expectation Maximization (MLEM) algorithm applied to Positron Emission Tomography (PET), the strategy can be applied to other algorithms and to different imaging modalities as will be appreciated by a person of skill in the art.

Shepp and Vardi were the first to propose the MLEM algorithm for tomographic image reconstruction problems [Shepp, 1982]. The image update equation for each iteration of the EM algorithm proposed by Shepp and Vardi can be written as follows:

$$\bar{f}_j^{(k+1)} = \frac{\bar{f}_j^{(k)}}{\sum_{i=1}^{N} a_{i,j}} \cdot \sum_{i=1}^{N} \left( \frac{a_{i,j} y_i}{\sum_{b=0}^{B} a_{i,b} \bar{f}_b^{(k)}} \right) \text{ for } j = 1, \ldots, B \quad (11)$$

where $a_{i,j}$ are the coefficients of the system matrix A representing the probability that a disintegration coming from the $j^{th}$ voxel will be detected by the $i^{th}$ detector pair, $\bar{f}^{(k)}$ is a vector representing the source activity distribution in B source voxels at the $k^{th}$ iteration and y is a vector containing the N projections measured by the imaging system. Moreover, for iterative methods, a distinction is made between the vector y which contains the measurement acquired by the imaging system from the vector $\bar{y}$ which contains an estimate of the measurement.

The first step of MLEM image reconstruction algorithm includes providing a first image estimate to be used in (11). This first image estimate generally contains a uniform distribution of the activity collected by the image system 10. Using the MLEM algorithm, the image reconstruction task than consists of updating the image estimate $\bar{f}(k)$ with (11) until the algorithm has converged to the optimal solution. The computations involved in (11) can be decomposed in four main steps:

(a) Forward project the image estimate:

$$y_i = \sum_{j=1}^{B} a_{i,j} \cdot f_j \quad (12)$$

(b) Compute the measurement correction vector:

$$\varepsilon_i = \frac{y_i}{\bar{y}_i} \text{ for } i = 1, \ldots, N \quad (13)$$

(c) Back project the correction vector:

$$\delta_i = \sum_{i=1}^{N} a_{i,j} \cdot \varepsilon_i \quad (14)$$

(d) Update the image estimate:

$$\bar{f}_j^{(k+1)} = \bar{f}_j^{(k)} \cdot \delta_j \text{ for } j=1,\ldots,B \quad (15)$$

Much of the computation burden associated to the MLEM algorithm comes from the forward (12) and back (14) projection steps that involve matrix-vector operations between the system matrix model A and the projection data vectors (y and ε) and the image vectors (f and δ).

According to one preferred embodiment of the present invention, the matrix-vector operations involved in the forward (12) and back (14) projection steps are replaced by the accelerated matrix-vector multiplication method presented in pseudo-code C-1 and pseudo-code C-2 which were applied for system matrix models derived from polar (or cylindrical) coordinate image representations. All techniques presented in the previous sections may be applied to accelerate the matrix-vector multiplication of the forward (12) and back (14) projection steps.

Another particularity of the presentation for implementing the iterative algorithm, in that case MLEM, is that the steps in equation (12) to (14) are performed within a loop before the image update step in (15) is performed. This strategy allows the allocation of a limited amount of memory for the projection data vectors (y and ε) which in turn results in less cache memory pollution and better memory reuse. More precisely, when using pseudo-code C-1, a vector of 2·Nφ·Nθ can be used for the vectors y and c which can share the same memory. When using pseudo-code C-2, a vector of 2·Sy·Nφ·Nθ is used for y and ε since a bloc of Sy is updated at the same time.

Another kind of iterative solver may be used instead of the MLEM algorithm. For example, the use of a block iterative algorithm, like the Ordered Subsets Expectation Maximization (OSEM) [Hudson, 1994] algorithm, allows the computational speed of iterative image reconstruction to be increased even further. The adaptation to other iterative solvers will be straightforward to a person of skill in the art. Block iterative methods include dividing the measurement vector into different subsets that are used one after the other in the forward and back projection steps to update the image estimate vector. The subsets can also be made from a group of voxels. One iteration loop is completed when all the subsets have been used in the computation to update the image estimate. One constraint when using a block iterative solver is that the symmetric TORs should be in the same subset group in order to fully take advantage of the proposed method to accelerate matrix-vector operations.

Figure 13:
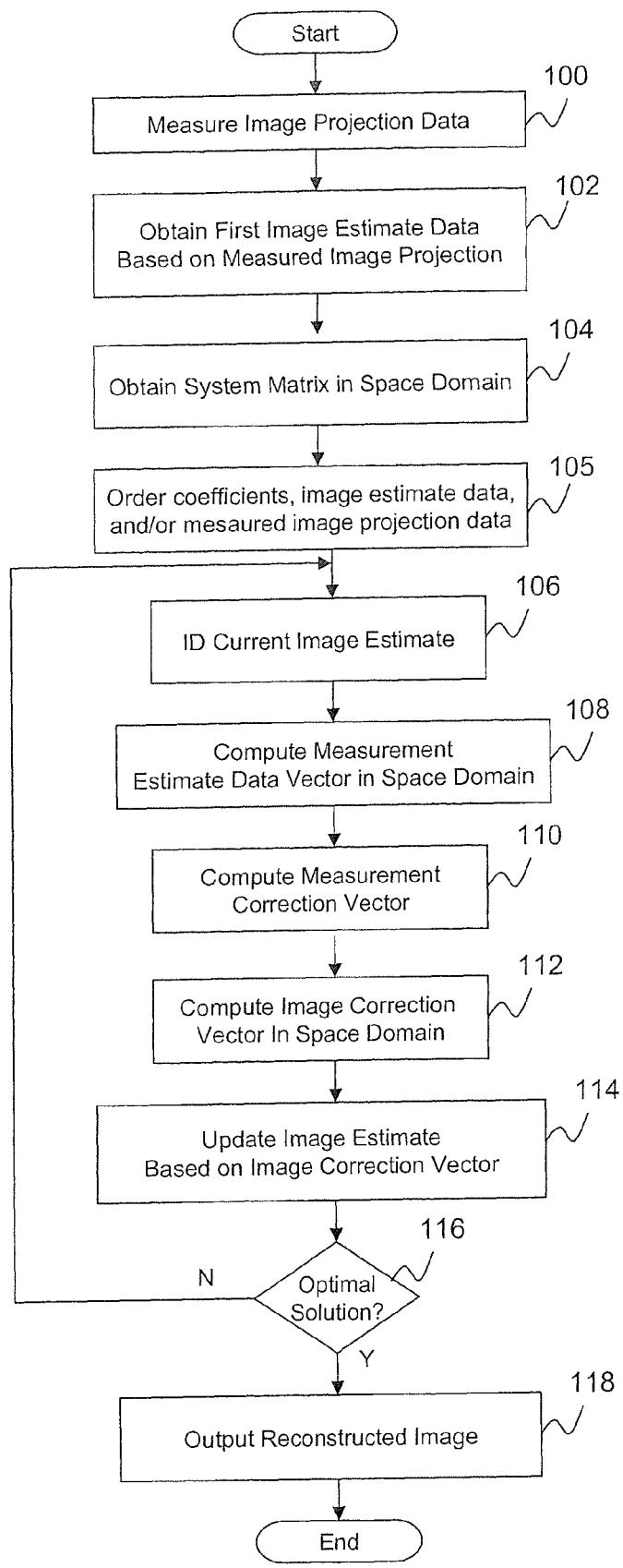
FIG. 13 is a flow diagram of an image reconstruction process executed by the image reconstruction system 10 of FIG. 11 according to one embodiment of the invention.

FIG. 13 is a flow diagram of an image reconstruction process executed by the main controller 33 according to one embodiment of the invention. The process may be described in terms of a software routine executed by one or more processors of the main controller 33 based on computer program instructions stored in memory of the main controller. A person of skill in the art should recognize, however, that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and in step 100, the main controller 33 invokes the detectors 15, front-end electronics 27, signal processor 28, coincidence sorter system 29, acquisition system 30 and/or bed motor controller 32 to measure and obtain image projection data.

In step 102, the main controller obtains a first image estimate data based on the measured image projection data.

In step 104, the main controller obtains a system matrix mapping each of the measured image projection data to pixels of an image, where the pixels are positioned according to a polar or cylindrical coordinate grid. According to one embodiment, the polar or cylindrical coordinate grid maintains the angular and axial symmetries between the TORs of the imaging system. According to one embodiment, only non-redundant portions of the system matrix are stored. In this regard, only the matrix coefficients that are associated with a unique TOR and pixel combination are stored in memory. The stored coefficients are then reused for the axial translation symmetries and in-plane rotation symmetries associated with the stored TOR.

In step 105, the main controller orders at least one of the system matrix coefficients, first image estimate data, and measured image projection data according to one or more symmetries of the imaging system. Specifically, the data is ordered so that symmetric matrix coefficients, symmetric image estimate data, and/or symmetric measured image projection data are respectively stored in contiguous memory locations (e.g. cache and/or RAM memory). For example, the ordering of the system matrix ensures that a system matrix coefficient is fetched from memory and reused among all the symmetric TORs before fetching another coefficient of the system matrix.

The main controller then invokes the iterative image reconstructor 35 to iteratively compute an image estimate by executing steps 106-116, until a suitable image estimate is obtained. In this regard, in step 106, the iterative image reconstructor 35 identifies a current image estimate. For the first iteration of the computation, the current image estimate is the first image estimate data obtained in step 102.

In step 108, the iterative image reconstructor computes a measurement estimate data vector based on a matrix-vector operation in the spatial domain between the system matrix and the current image estimate. In this regard, the image reconstructor executes a forward image projection step according to pseudo-code C-1. In this regard, the image reconstructor forward projects the current image estimate with the system matrix to obtain an estimate of the image projection data. According to one embodiment, the measurement estimate data vector is stored in a circular buffer memory of a size 2*N, where N is a number of symmetric TORs of the imaging system.

In step 110, the iterative image reconstructor computes a measurement correction vector based on the measurement estimate data vector and the measurement data vector. According to one embodiment, the image reconstructor invokes formula (13) discussed above in order to compute the measurement correction vector. According to one embodiment, the measurement correction vector is also stored in a circular buffer memory.

In step 112, the iterative image reconstructor computes an image correction vector based on a matrix-vector operation in the spatial domain between the system matrix and the measurement correction vector in the spatial domain. In this regard, the image reconstructor executes a back projection step according to pseudo-code C-2. That is, the image reconstructor back projects the measurement correction vector with a transpose of the system matrix to obtain image correction data.

According to one embodiment, multiple processors may be used to allow the mathematic operations for the forward and back projections to be divided and distributed over the multiple processors to speed up the image reconstruction process. The mathematical operations may also be implemented via assembly language instructions or other language instructions that allow a same operation to be performed in parallel in a single clock cycle for reducing the computation time. In addition, memory blocking techniques may be employed so that only part of the system matrix and image measurement data vectors are accessed at a time in order to favour use of cache memory and RAM memory.

In step 114, the iterative image reconstructor updates the current image estimate based on the image correction vector. According to one embodiment, the image reconstructor performs the update according to formula (15) discussed above.

In step 116, a determination is made as to whether the current image estimate is an optimal solution. The image reconstructor may determine that the optimal solution has been achieved when the current image estimate satisfies a predefined criteria. Such a predefined criteria can be obtained from a mathematical formula that evaluates for example if the image estimate has reached a good compromise between the spatial resolution and the level of noise in the image (i.e. more iterations can improve the image spatial resolution but at the cost of increasing the image noise). The predefined criteria can also be based on a user judgement about the image quality from a visual inspection of the image.

When the optimal solution has been achieved, the image reconstructor outputs a reconstructed image in step 118. For example, the reconstructed image may be sent to the display unit 20 for visualization. In this regard, the image reconstructor may be configured to reorder the image estimate vector and convert the reordered data into a Cartesian image representation that is suitable for display on the display unit 20.

Attenuation Correction

While not restricted to, another example is provided of an application of the embodiments of the present invention to reduce the memory requirement and accelerate the computation of a given task related to image reconstruction. Again, the example provided relates to PET imaging, but it can be adapted to other imaging modalities as will be appreciated by a person of skill in the art.

In PET, the annihilation photons can interact with surrounding matter in the subject and sometimes be fully absorbed before they can reach the detectors of the TEP camera. In order to retrieve the true distribution of activity in the subject, the attenuation correction phenomenon is quantified and an appropriate correction is applied within the PET image reconstruction algorithm. The task consists in finding the right attenuation correction factors to applied individually to each TOR of the camera.

The probability of the annihilation photon going through matter without being attenuated in PET can be expressed as follow:

$$\frac{I_t}{I_0} = e^{-\mu x} \quad (16)$$

where $I_0$ is the initial number of photons entering in the matter, $I_t$ is the number of photons transmitted without any interaction in the matter, x represents the distance travelled in the matter, and $\mu(E_y)$ is the linear attenuation coefficient of the object (in cm-1) for photons with an energy of $E_y$. For this particular example that refers to PET imaging, the energy of the photon is $E_y=511$ keV which correspond to the energy of the annihilation photon that hits the detector. In PET, both annihilation photons should have travelled into the matter of the subject without being absorbed and be detected by a pair of coincident detectors to lead to a valid detection.

The attenuation factor estimate for PET is usually found using an attenuation map image which can give the information about the linear attenuation coefficient of each region of the image. Such attenuation map can be derived from PET imaging or other imaging modalities like X-ray Computed Tomography (CT) or Magnetic Resonance Imaging (MRI). Using the attenuation map image and $f_{map}$ and an appropriate modelling of the attenuation process, the attenuation factor $\eta$ can be found from a matrix-vector operation:

$$\lambda = A \cdot f_{map} \quad (17)$$

$$\eta_i = \exp(-\lambda_i) \quad (18)$$

where A is a N×B attenuation matrix with coefficients $a_{i,j}$ representing the average distance travelled by the photon detected by the $i^{th}$ detector pair in the $j^{th}$ image voxel of the attenuation map.

One main computation task then comes from the matrix-vector multiplication in equation (17). By defining the attenuation map image in a polar (or cylindrical) coordinate referential and by computing an attenuation matrix model for this image configuration, it is possible to use the embodiments of the present invention to accelerate the computation for obtaining the attenuation factor values.

Another advantage of the proposed method is that the matrix size reduction obtained by the preservation of system symmetries facilitate the storage and the use of a precomputed attenuation matrix model. Since such model could be computed only once, it is possible to use more complex and accurate modelling of the attenuation process without having an important speed penalty during the computation of the attenuation factors.

Other Applications

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. For example, any techniques or image reconstruction applications that can make use of a system matrix model which has some symmetries can take advantage of the above-described mechanisms for accelerating such techniques or image reconstruction applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

The invention claimed is:

1. An image reconstruction method based on image projection data collected by an imaging system having N tubes of response (TORs) having $N_\phi$ axial translation symmetries and $N_\theta$ in-plane rotation symmetries between the TORs, the method comprising:
measuring image projection data via the imaging system and generating a measurement data vector in response;
ordering the measured image projection data according to one or more symmetries of the imaging system, wherein the measured image projection data associated with TORs having axial or translation symmetry are stored in contiguous memory locations;
obtaining a first image estimate data based on the measured image projection data;
obtaining a system matrix mapping each of the measured image projection data to pixels of an image, wherein the pixels are positioned according to a polar or cylindrical coordinate grid, wherein each matrix coefficient stored in memory is associated with a TOR and pixel combination which has no axial nor translation symmetry to other TOR and pixel combinations for which a matrix coefficient has been stored in the memory;
iteratively computing an image estimate, wherein the iteratively computing includes:
identifying a current image estimate stored in an image data vector;
computing a measurement estimate data vector based on a first matrix-vector operation in a spatial domain between the system matrix and the current image estimate;
computing a measurement correction vector based on the measurement estimate data vector and the measurement data vector;
computing an image correction vector based on a second matrix-vector operation in the spatial domain between the system matrix and the measurement correction vector; and
updating the current image estimate based on the image correction vector; and
outputting a reconstructed image based on the updated image estimate.

2. The method of claim 1, wherein in performing the first matrix-vector operation or the second matrix-vector operation, a stored matrix coefficient is retrieved from the memory and reused for respectively computing values of the measurement estimate data vector or the image correction vector associated with a group of TORs having translation or rotation symmetries, before retrieving another value of the system matrix.

3. The method of claim 1, wherein values of the measurement estimate data vector or image correction vector associated with a group of TORs having translation or rotation symmetries, are stored in a circular buffer memory, wherein a size of the circular buffer memory is 2*N, wherein N is an integer value reflective of a number of the TORs having the translation or rotation symmetries.

4. The method of claim 1 further comprising storing the image data vector and measurement estimate data vector in cache memory.

5. The method of claim 1, wherein all or a part of the first matrix-vector operation or the second matrix-vector operation is performed with assembly language instructions configured to concurrently perform a same operation on multiple data.

6. The method of claim 5, wherein the performed operation is one of an addition operation and multiplication operation.

7. The method of claim 5, wherein the performed operation is performed in parallel on the multiple data in a single clock cycle.

8. The method of claim 5, wherein the assembly language instructions are executed on parallel graphics processors.

9. The method of claim 1, wherein the first matrix-vector operation or second matrix-vector operation includes blocking a portion of the memory for accessing only part of the system matrix, image data vector, and measurement estimate data vector at a time.

10. The method of claim 1, wherein the first matrix-vector operation or second matrix-vector operation is distributed over a plurality of processors.

11. The method of claim 1, wherein the polar or cylindrical coordinate grid maintains the angular and axial symmetries between the TORs of the imaging system.

12. The method of claim 1, wherein the pixels are volumetric pixels.

13. The method of claim 1, wherein the computing the measurement estimate data vector includes forward projecting the current image estimate with the system matrix to obtain an estimate of the image projection data.

14. The method of claim 1, wherein the computing the image correction vector includes back projecting the measurement correction vector with a transpose of the system matrix to obtain image correction data.

15. The method of claim 1, wherein the generating the measurement estimate data vector is performed during computing an attenuation correction factor from an attenuation coefficient map.

16. The method of claim 1, wherein the system matrix is computed via an analytical method modelling a geometry of detecting elements of the imaging system.

17. The method of claim 1 further comprising ordering the system matrix coefficients in a TOR-row format, wherein each row of the matrix corresponds to coefficients of one TOR of the imaging system.

18. The method of claim 1, wherein each matrix coefficient stored in the memory is associated with a pixel providing a non-null contribution to a particular TOR.

19. An image reconstruction system for reconstructing an image based on image projection data, the system having N tubes of response (TORs) with $N_\phi$ axial translation symmetries and $N_\theta$ in-plane rotation symmetries between the TORs, the system comprising:
a memory; and
one or more processors coupled to the memory, the one or more processors being configured to execute computer program instructions stored therein, the computer program instructions including:
acquiring image projection data and generating a measurement data vector in response;
ordering the measured image projection data according to one or more symmetries of the image reconstruction system, wherein the measured image projection data associated with TORs having axial or translation symmetry are stored in contiguous memory locations;
obtaining a first image estimate data based on the measured image projection data;
obtaining a system matrix mapping each of the measured image projection data to pixels of an image, wherein the pixels are positioned according to a polar or cylindrical coordinate grid, wherein each matrix coefficient stored in the memory is associated with a TOR and pixel combination which has no axial nor translation symmetry to other TOR and pixel combinations for which a matrix coefficient has been stored in the memory;

iteratively computing an image estimate, wherein the iteratively computing includes:
identifying a current image estimate stored in an image data vector;
computing a measurement estimate data vector based on a first matrix-vector operation in a spatial domain between the system matrix and the current image estimate;
computing a measurement correction vector based on the measurement estimate data vector and the measurement data vector;
computing an image correction vector based on a second matrix-vector operation in the spatial domain between the system matrix and the measurement correction vector; and
updating the current image estimate based on the image correction vector; and outputting a reconstructed image based on the updated image estimate.

* * * * *